(12) United States Patent
Kohlbrenner

(10) Patent No.: US 8,573,347 B2
(45) Date of Patent: Nov. 5, 2013

(54) WHEELED VEHICLE WITH ELECTRIC DRIVE IN THE REAR FRAME TRIANGLE AND ELECTRIC MOTOR FOR A WHEELED VEHICLE

(76) Inventor: Philippe Kohlbrenner, Kaltacker (CH)

( * ) Notice: Subject to any disclaimer, the term of this patent is extended or adjusted under 35 U.S.C. 154(b) by 144 days.

(21) Appl. No.: 13/085,914

(22) Filed: Apr. 13, 2011

(65) Prior Publication Data

US 2011/0247888 A1    Oct. 13, 2011

(30) Foreign Application Priority Data

Apr. 13, 2010   (DE) .......................... 10 2010 003 926

(51) Int. Cl.
*B62M 6/40* (2010.01)

(52) U.S. Cl.
USPC ..................................... 180/206.7; 180/206.5

(58) Field of Classification Search
USPC ......... 310/67 A, 88; 180/205.1, 205.6, 206.1, 180/206.5, 206.7, 206.8
See application file for complete search history.

(56) References Cited

U.S. PATENT DOCUMENTS

| | | | | |
|---|---|---|---|---|
| 2,104,707 | A * | 1/1938 | Rawlings | 310/66 |
| 3,921,745 | A * | 11/1975 | McCulloch et al. | 180/206.1 |
| 4,636,670 | A * | 1/1987 | Kallstrom | 310/67 A |
| 4,677,328 | A * | 6/1987 | Kumakura | 310/67 R |
| 4,847,528 | A * | 7/1989 | Eguchi et al. | 310/239 |
| 5,758,735 | A | 6/1998 | MacCready, Jr. | |
| 5,977,675 | A * | 11/1999 | Oelsch | 310/90 |
| 6,002,187 | A * | 12/1999 | Ohkura et al. | 310/67 A |
| 6,024,186 | A | 2/2000 | Suga | |
| RE37,443 | E * | 11/2001 | Yaguchi | 180/205.1 |
| 6,616,422 | B2 * | 9/2003 | Hsieh | 417/354 |
| 7,264,256 | B2 * | 9/2007 | Fujii | 280/261 |
| 2007/0085431 | A1 * | 4/2007 | Hayakawa et al. | 310/90 |
| 2009/0266636 | A1 | 10/2009 | Naegeli | |
| 2010/0310390 | A1 * | 12/2010 | Huang et al. | 417/352 |

FOREIGN PATENT DOCUMENTS

| | | |
|---|---|---|
| CH | 697413 B1 | 9/2008 |
| DE | 19929613 | 1/2001 |
| DE | 69730928 T2 | 11/2005 |
| WO | 2009127263 | 10/2009 |

OTHER PUBLICATIONS

German Office Action Nov. 26, 2010.

* cited by examiner

*Primary Examiner* — Tony Winner
(74) *Attorney, Agent, or Firm* — RatnerPrestia

(57) ABSTRACT

A wheeled vehicle with a crank drive and an electric drive, comprising:
a) a frame which serves to suspend a front wheel and a rear wheel and comprises a seat tube, an upper rear wheel stay and a lower rear wheel stay which together at least substantially form a frame triangle for suspending the rear wheel;
b) a crank for converting muscular strength into torque;
c) a crank coupling for transferring the torque of the crank onto the rear wheel;
d) an electric motor comprising a stator and a rotor;
e) and a motor coupling for transferring a torque of the electric motor onto the rear wheel;
f) wherein the crank and the electric motor output onto the same side of the rear wheel, and
g) the electric motor is supported on the frame triangle
h) and arranged within the frame triangle as seen in a lateral view onto the wheeled vehicle.

39 Claims, 10 Drawing Sheets

# WHEELED VEHICLE WITH ELECTRIC DRIVE IN THE REAR FRAME TRIANGLE AND ELECTRIC MOTOR FOR A WHEELED VEHICLE

FIELD OF THE INVENTION

The invention relates to a wheeled vehicle with a crank drive and an electric drive, in particular a bicycle with such a hybrid drive. The invention also relates to a particularly compact electric motor and to an electric drive comprising the same, which does not require much space and is therefore particularly suitable driving a wheeled vehicle, for example one with a crank drive and an electric drive or also the electric drive only. The electric drive can be preferably used in bicycles and tricycles which can be powered by muscular strength, and in moped-like wheeled vehicles, as well as in wheelchairs, baby carriages and the like.

BACKGROUND OF THE INVENTION

Different designs of hybrid drives for cycles are known, including those of arranging an electric motor directly on the rotational axis of the rear wheel, the front wheel or the crank shaft. Arrangements integrated in this way require specially adapted and therefore complicated and expensive motor designs which are also subject to integration-related restrictions. Designs in which the electric motor is supported on the cycle frame in the vicinity of the crank housing, directly on or separately from the crank housing, and drives the rear wheel either separately from the crank via a coupling of its own or via a coupling in common with the crank, have therefore prevailed in the market. Reference is made for example to U.S. Pat. No. 4,541,500 B and U.S. Pat. No. 5,242,335 B. Such an arrangement does enable conventional motors to be used and also enables the performance of the crank drive and the electric drive, which is different in terms of rotational speed and torque, to be flexibly adapted; conversely, only a limited design space is however available around the bottom bracket housing, and assembly, maintenance and repair prove difficult. Arranging the motor between the bottom bracket housing and the rear wheel, as disclosed for example in U.S. Pat. No. 4,541,500 B, requires electric motors which are narrow in diameter and exhibit a small nominal torque and correspondingly high nominal rotational speed. The rotational speed of the motor is geared down onto the rear wheel pinion via a multiple-stage reducing gear system. If larger motors with correspondingly larger torque are to be used, the distance between the wheel axes has to be increased, in order to create sufficient space between the bottom bracket housing and the rear wheel. As a result, the known hybrid designs all require drastic changes to the conventional cycle geometry, up to and including a complete re-design.

SUMMARY OF THE INVENTION

It is an object of the invention to simplify the electric-motor drive portion of a wheeled vehicle with a crank drive and an electric drive, in particular to simplify integrating the electric drive, but to retain the flexibility with regard to adapting the electric drive to actualities of the crank drive.

In accordance with another aspect, an electric motor is to be provided which is compact but nonetheless powerful and therefore suitable in particular for driving a vehicle such as for example a wheeled vehicle with a crank drive and an electric drive or a vehicle which is driven by its electric motor only.

The invention proceeds from a wheeled vehicle with a crank drive and an electric drive, comprising: a frame for suspending a front wheel and a rear wheel; a crank for converting muscular strength into torque; an electric motor; and a crank coupling and a motor coupling for transferring the respective torque onto the rear wheel. The frame preferably comprises a seat tube which can also be referred to as a saddle tube if the wheeled vehicle is embodied as a bicycle. The frame can also comprise an upper rear wheel stay and a lower rear wheel stay for suspending the rear wheel. The seat tube and the two rear wheel stays can at least substantially form a frame triangle in a lateral view onto the wheeled vehicle, preferably on the side of the crank coupling. Another such frame triangle can be formed on the other side of the wheeled vehicle with the same seat tube but another upper rear wheel stay and another lower rear wheel stay, in order to suspend and/or support the rear wheel on the frame on both sides. Suspending it on one side only is not, however, to be ruled out. The upper and lower rear wheel stay can each extend as far as the saddle tube and be connected to it fixedly, preferably in a material fit, for example by means of a weld connection in each case. The two stays or also only one of said two stays can however also be connected to the saddle tube such that it can be moved, for example against the force of a spring or attenuator. In terms of weight and price, however, a connection which is simply fixed is preferred. The upper rear wheel stay extends backwards and downwards, as seen from the saddle tube, at least substantially towards a rotational axis of the rear wheel. The lower rear wheel stay extends backwards, as seen from the saddle tube, towards the rotational axis of the rear wheel; it can extend at least substantially horizontally. In this respect, the seat tube and the two rear wheel stays can in particular form a rear frame triangle, such as is prevalent in wheeled vehicles.

In advantageous embodiments, the electric motor is supported on the frame triangle and arranged within the frame triangle as seen in the lateral view onto the wheeled vehicle. Arranging it in the frame triangle allows the electric motor to be rigidly supported on both the upper and the lower rear wheel stay. It is simple for the electric motor to be assembled, even latterly for example by the user or dealer, not least because of the practically free accessibility of the location at which it is arranged. It is also advantageously possible to draw on proven, conventional cycle geometries, for example to use a conventional frame, i.e. arranging the electric motor in accordance with the invention does not require any special frame design. Except for the electric drive which is provided in addition to the crank drive, a cycle in accordance with the invention can be designed conventionally in mechanical terms; thus, in particular, it is not necessary to increase the wheel distance in order to integrate the electric drive. With regard to adapting the performance of the motor to the crank drive, the same flexibility exists as when arranging the electric motor more closely in the region around the bottom bracket housing. Conversely, arranging it nearer to the rotational axis of the rear wheel is in particular advantageous if the electric motor outputs directly onto the rear wheel via the motor coupling and is not coupled only via the crank coupling to the rear wheel.

It is desirable to arrange the electric motor near to the rotational axis of the rear wheel in order to support the electric motor as rigidly as possible and to keep vibrations in the electric drive low. It is therefore advantageous if the rotational axis of the electric motor exhibits a smaller distance from the rotational axis of the rear wheel than from the nearest point of the seat tube, i.e. the electric motor is arranged in the rear region, preferably completely arranged in the rear half of the frame triangle.

The electric motor is preferably arranged far enough away from the rotational axis of the crank that it is situated outside the circumferential circle of the crank. In an arrangement in which it is spaced from the crank in this way, the motor can at least in principle protrude outwards in the axial direction, parallel to the rotational axes of the wheels, up to the height of the interior side of the crank and even beyond. Otherwise, the electric motor would have to be axially flat enough that the crank can pass over it during pedaling. Preferably, however, the electric motor is situated completely outside the circumferential circle of the crank, in that its rotational axis comes to rest a corresponding distance into the rear region of the frame triangle, and the outer circumference of a housing of the electric motor is still situated outside the crank circle.

Preferably, the electric motor is axially flat enough and arranged axially near enough to the rear wheel that it is axially short of a pedal of the crank and does not come into contact, during pedaling, with the rider's heel which may protrude backwards beyond the crank. Designing and arranging the motor in this way is advantageously combined with arranging it radially outside the crank circle.

In preferred embodiments, the electric motor is not only arranged within the frame triangle in the lateral view but also overlaps axially with the upper and lower rear wheel stay, i.e. protrudes axially into the frame triangle towards the rear wheel.

The crank coupling can for example comprise a Cardan shaft, preferably a flexible Cardan shaft, or in particular a traction means drive. The traction means can be a belt, preferably a toothed belt such as for example a carbon fiber reinforced plastic belt, or a chain. The same applies analogously to the motor coupling. The electric motor can output onto the rear wheel via the crank coupling, for example by engaging with a traction means of the crank coupling. More preferably, however, the motor coupling extends as far as the rear wheel, separately from the crank coupling. If the motor coupling comprises a traction means drive, which also includes the scenario in which the motor coupling consists of the traction means drive, then a toothed belt is preferably used. One advantage of the toothed belt is its zero-clearance run. The toothed belt can in particular be a plastic toothed belt, preferably a fiber-reinforced plastic toothed belt. Carbon fiber reinforced plastic belts exhibit the advantage of lower, practically negligible elasticity. They run with little wear or noise. Arranging the motor near to the rear wheel axis is also advantageous for the reason that, if the motor coupling is embodied as a traction means drive, the traction means can be embodied with a short length.

The electric motor and the crank coupling can be arranged on mutually opposing sides of the wheeled vehicle, the crank coupling for example to the right of the rear wheel as is usual, and the electric motor to the left of the rear wheel. Correspondingly, the crank and the electric motor would output onto the rear wheel on different sides.

In preferred embodiments, however, the crank and the electric motor output onto the same side of the rear wheel. In such embodiments, the electric motor is arranged on the same side as the crank coupling. If each of the crank coupling and the motor coupling is or comprises a traction means drive, then each of the couplings preferably comprises a rear wheel pinion of its own which can be rotated about the rotational axis of the rear wheel, i.e. the crank coupling comprises a crank rear wheel pinion and the motor coupling comprises a motor rear wheel pinion. If the motor coupling extends separately from the crank coupling as far as the rear wheel, a crank rear wheel pinion which is arranged in the crank coupling and can be rotated about the rotational axis of the rear wheel and a motor rear wheel pinion which is arranged in the motor coupling and can be rotated about the rotational axis of the rear wheel can be axially arranged directly next to each other. The crank rear wheel pinion and the motor rear wheel pinion can be separated from each other in drive terms by a freewheel arranged on the rotational axis of the rear wheel or each by such a freewheel, in order to prevent the crank from driving the electric motor or the electric motor from driving the crank. More preferably, however, the motor rear wheel pinion and the crank rear wheel pinion are formed together in one piece or non-rotationally connected to each other in relation to both rotational directions, preferably to form a double pinion comprising these two pinions only, and thus form a rotational unit. At least one freewheel, preferably a motor freewheel and a crank freewheel, is nonetheless preferably provided, but at another location, preferably in the torque path nearer to the motor or the crank.

In accordance with preferred embodiments, the torque of the electric motor can be transferred onto the rotational axis of the rear wheel via a motor freewheel which is spaced from the rotational axis of the rear wheel, or the torque of the crank can be transferred onto the rotational axis of the rear wheel via a crank freewheel which is spaced from the rotational axis of the rear wheel.

If the crank coupling and the motor coupling extend next to each other on the same side of the rear wheel, it is preferred if the motor coupling is axially nearer to the rear wheel than the crank coupling. If the two couplings are each embodied by means of a traction means, the motor rear wheel pinion is axially the inner pinion and the crank rear wheel pinion is axially the outer pinion of these two pinions in such arrangements. In such embodiments, a motor shaft of the electric motor can axially overlap the crank coupling.

In order to be able to arrange the electric motor near to the rotational axis of the rear wheel, the electric motor can overlap with the crank coupling as seen in the lateral view onto the wheeled vehicle. Preferably, a rotor or stator of the electric motor overlaps with the crank coupling. In accordance with the invention, the word "or" is always understood here as elsewhere to mean "inclusive or", i.e. it encompasses both the sense of "either . . . or" and of "and", unless only one of these two senses can exclusively follow from the respectively specific context. In relation to the overlapping arrangement, this means that only the stator overlaps with the crank coupling in first variants, only the rotor overlaps with the crank coupling in second variants, and both the rotor and the stator overlap with the crank coupling in third variants. In the case of a coupling by means of traction means, the stator or rotor preferably only overlap(s) an upper run of the traction means of the crank coupling. The stator or rotor expediently lie(s) axially on the outside of the crank coupling, and a motor pinion lies axially on the inside of the crank coupling, nearer to the rear wheel than the crank coupling.

In order to be supported rigidly, the electric motor can be supported on both rear wheel stays simultaneously by means of a support device which extends to the upper rear wheel stay and the lower rear wheel stay. The support device comprises an upper support and a lower support. The electric motor is supported on the upper rear wheel stay by means of the upper support and on the lower rear wheel stay by means of the lower support. The electric motor is preferably fastened to the outside of the support device, as seen from the rear wheel. The connection is preferably releasable, for example a releasable screw connection. If the support device is formed in one piece, it preferably comprises a passage through which a motor output shaft extends towards the rear wheel, such that a motor pinion from which the electric motor can output onto the rear wheel can be arranged between the support device and the rear wheel. The support device can however also preferably comprise multiple parts, preferably two parts. In the multiple-part variant, the lower support is embodied separately from the upper support. The upper support serves to support the electric motor on the upper rear wheel stay, and the lower support serves to support the electric motor on the lower rear wheel stay. The single-part support device can in particular be a sheet metal structure which is formed in accordance with the spatial actualities of the frame triangle. The same applies to the preferably multiple-part support device, i.e. to each of its separate supports. Instead of one or more sheet metal structures, a support device or supports of a multiple-part support device made of plastic, preferably a reinforced plastic, may also be considered. A support device comprising multiple parts, preferably exactly two parts, has the advantage that the individual supports can be formed more simply than a single-part support device, not least because the area spanned by the frame triangle is in most cases not perpendicular to the rotational axis of the rear wheel. The electric motor is preferably aligned with respect to this rotational axis by means of the support device. In preferred embodiments of the multiple-part support device, a clear distance remains between the separate supports and thus a free space in the region of which a traction means of a preferred crank coupling can extend as seen in the lateral view onto the wheeled vehicle, such that the divided support device can be narrower than a single-part support device by at least the wall thickness of the support device in the axial direction if the electric motor is arranged overlapping. Lastly, embodying the support device in multiple parts can also save weight.

A multiple-part support device can in particular comprise an upper support which is connected to the upper rear wheel stay, and a lower support which is connected to the lower rear wheel stay, wherein the upper support protrudes from the upper rear wheel stay towards the lower rear wheel stay as seen in a lateral view onto the rear wheel, and the lower support protrudes from the lower rear wheel stay towards the upper rear wheel stay as seen in a lateral view onto the rear wheel. As seen in the lateral view, a clear distance preferably remains between the supports—the aforesaid free space, for example for a chain or belt. The motor can be regarded as part of the support device if a housing part of the motor which serves as an assembly structure of the motor and is spatially fixed in relation to the frame is connected to each of the upper support and lower support. A housing cover preferably forms said assembly structure. As seen in the lateral view, the motor bridges the free space between the supports. Where a two-part support device has been mentioned above, this does not include the connecting assembly structure of the motor such as for example a housing cover. The assembly structure is or can be assembled, preferably detachably, on the support device.

In preferred embodiments, the upper support is supported in an extension along the upper rear wheel stay in the form of a line or strip or on support points which are spaced from each other and/or the lower support is supported in an extension along the lower rear wheel stay in the form of a line or strip or on support points which are spaced from each other. Within the sense of being rigidly supported, the electric motor is preferably arranged such that the upper support extends from the upper rear wheel stay towards the rotational axis of the rotor of the electric motor, and the lower support extends from the lower rear wheel stay towards the rotational axis of the rotor of the electric motor. As seen in the lateral view, parallel to the rear wheel axis, a straight line which is radial with respect to the rotational axis of the rotor thus intersects the upper rear wheel stay between the end points of supporting the upper support, and a straight line which is radial with respect to the rotational axis of the rotor intersects the lower rear wheel stay between the end points of supporting the lower support. As already mentioned, the upper support and the lower support can be formed in one piece or can be fixedly and directly connected to each other. More preferably, however, they are produced separately and exhibit said free space between them.

If the electric motor is supported on at least one support point of the upper rear wheel stay by means of an upper support and on at least one support point of the lower rear wheel stay by means of a lower support, the upper support for rigidly supporting can advantageously be arranged such that in the lateral view parallel to the rotational axis, the rotational axis of the rotor lies in a triangle, the corner points of which are the rotational axis of the rear wheel, the at least one support point of the upper rear wheel stay and the at least one support point of the lower rear wheel stay. This includes an arrangement such that the rotational axis of the rotor lies on a connecting straight line which connects the support points to each other. In embodiments in which the upper support is supported on the upper rear wheel stay in the form of a line as seen in the lateral view, or the lower support is supported on the lower rear wheel stay in the form of a line as seen in the lateral view, an end point at the respectively supporting end facing away from the rear wheel axis replaces the at least one support point of the respective rear wheel stay, i.e. the two corner points of the triangle away from the rear wheel axis. If the motor is supported by means of the upper support at multiple support points of the upper rear wheel stay or by means of the lower support at multiple support points of the lower rear wheel stay, the motor is preferably arranged such that the rotational axis of the motor lies in a range of area, including the edge of the range of area, which is defined by a first connecting straight line and a second connecting straight line. The first connecting line connects a first support point of the upper rear wheel stay to a first support point of the lower rear wheel stay. The second connecting line connects a second support point of the upper rear wheel stay to a second support point of the lower rear wheel stay; however, the second support point of the upper rear wheel stay exhibits a distance from the first support point of the upper rear wheel stay, or the second support point of the lower rear wheel stay exhibits a distance from the first support point of the lower rear wheel stay. In the extreme case, the range of area can be a triangular area if only one support point is provided on one of the rear wheel stays but the first and second connecting line preferably extend between the rear wheel stays at a distance from each other throughout. In embodiments in which the upper support is supported on the upper rear wheel stay in the form of a line as seen in the lateral view or the lower support is supported on the lower rear wheel stay in the form of a line as seen in the lateral view, respectively supporting end points replace the first and second support point of the respective rear wheel stay.

In preferred embodiments, the rear wheel can be driven by the crank via a variable gear system, expediently a shifting gear system. Multiple crank rear wheel pinions can then for example be arranged next to each other on the rotational axis of the rear wheel and shifted by means of a traction means lifter. More preferably, the variable gear system is arranged in a hub of the rear wheel. The variable gear system can in particular be a planetary gear system. The crank drive outputs onto a gear input shaft of the variable gear system.

In one development, the electric motor is also coupled to the rear wheel via a variable gear system, expediently a shifting gear system, such that the rotational speed ratio of the rear wheel relative to the motor can be varied using said variable gear system. Preferably, the electric motor drives the rear wheel via the same variable gear system as the crank. Even more preferably, the electric motor outputs via the motor coupling onto the same gear input shaft as the crank drive. If, as is preferred, the motor coupling is separate from the crank coupling, the two drives transfer their torque separately from each other as far as the rear wheel, but the two torques are introduced into the same gear input member. In such embodiments, this common gear input member and/or common gear input shaft is fixedly connected to the motor rear wheel pinion and the crank rear wheel pinion, at least in the drive rotational direction, such that the common gear input member is driven directly via these two rear wheel pinions and outputs onto the rear wheel hub via other gear members of the variable gear system. This also makes it simpler, if the variable gear system is embodied as a manually operable shifting gear system, for the rider to manage the hybrid drive and reduces the effort which has to be expended in the design as compared to a drive design with only one of the two types of drive.

If the rear wheel pinions of the drives, which are arranged on the rotational axis of the rear wheel, are simply connected non-rotationally to the same gear input member of the variable gear system, i.e. if an optional freewheel of the electric drive or the crank drive is spaced from the rotational axis of the rear wheel and preferably arranged in the region of the crank or the electric motor, then no adaptation effort or at least only very little adaptation effort has to be expended at the rear wheel and in the region in which the rear wheel is suspended. A double toothed wheel, formed from the crank rear wheel pinion and the motor rear wheel pinion, can be designed to be axially narrow and can in practice be arranged like a single pinion on the rotational axis. Arranging a motor freewheel spaced from the rotational axis of the rear wheel is also advantageous for the freewheel itself. A motor freewheel can then advantageously be arranged directly at the electric motor, advantageously on the rotational axis of the motor shaft, or however—if the latter does not coincide with the rotational axis of the rotor of the electric motor—on the rotational axis of the rotor. Since the rotational speed of the electric motor is preferably geared down onto the rear wheel, the torque stress on the motor freewheel can be reduced in comparison to the freewheel arranged on the rotational axis of the rear wheel, in accordance with the gearing-down ratio, and the motor freewheel can be dimensioned to be correspondingly weaker. This saves on costs and also design space for the freewheel.

The electric motor can drive the rear wheel via a Cardan shaft, preferably a flexible Cardan shaft, alternatively and more preferably via a pair of spur wheels or even more preferably by means of a traction means gear system. As already mentioned, a toothed belt drive is particularly preferred. In addition to the advantages mentioned, a toothed belt drive also allows the rotational speed of the motor to be significantly geared down, not least because of the fine tooth pitch which can be realized by means of a toothed belt. It is thus in accordance with preferred embodiments if the toothed belt is equipped with regard to its toothing with a modulus of at most two, more preferably at most 1.5. This helps to ensure that a motor pinion is always in engagement with the toothed belt via a sufficient number of teeth, and the diameter of the motor pinion can thus advantageously be reduced in order to increase the gearing reduction.

In preferred embodiments, a motor freewheel is arranged between the rotor of the electric motor and the motor shaft. The motor freewheel can in particular be arranged in an annular gap between the rotor and a motor shaft which extends into or through the rotor and can in particular be formed as a sleeve freewheel. WO 2009/127263 A1 and PCT/EP2009/055308 are referenced with respect to advantageous arrangements of the motor freewheel. Preferably, a freewheel is arranged in the crank coupling. The crank freewheel can in particular be arranged between the crank shaft and the crank pinion. If both a motor freewheel and a crank freewheel are arranged, the wheeled vehicle can optionally be driven either by means of the crank only or by means of the electric motor only or by both drives in overlap, wherein the motor does not drive the crank and the crank does not drive the electric motor. Preferred options for drive management are likewise disclosed in said two PCT applications in connection with measuring the torque transferred from the crank shaft, such that each of the two PCT applications are also referenced with respect to drive management and measuring the torque transferred from the crank shaft.

In preferred embodiments, the electric motor is configured such that the rotor comprises a rotor cup which circumferentially surrounds the stator on one facing side and at the outer circumference, and such that the rotor cup forms an outer housing of the electric motor, i.e. is directly in contact with the environment. One consequence of this embodiment is that the outer housing of the electric motor rotates when the electric motor is in operation. In preferred embodiments, the electric motor is an external rotor; correspondingly, an electromagnetically active part of the rotor can surround the stator at the outer circumference, forming a narrow gap. The electromagnetic part of the rotor is arranged on the interior side of the circumferential wall of the rotor cup or forms the circumferential wall. The electromagnetically active part of the rotor is preferably composed of permanent magnets which are arranged on the circumferential wall of the cup in an alternating pole sequence in the circumferential direction. WO 2009/127263 A1 is also referenced with respect to preferred features of the external rotor motor, so far as it is not the outer housing of the electric motor.

The stator can advantageously form a cover for the rotor cup, wherein said cover is stationary relative to the frame of the wheeled vehicle. The stator advantageously comprises the electromagnetic part of the electric motor which is to be supplied with electrical power, i.e. its coil(s). The rotor cup surrounds the stator, preferably on its axial exterior side, the side facing away from the rear wheel. The cover formed by the stator—referred to in the following as the stator cover—is preferably likewise an exterior wall of the housing, namely a housing cover. The stator cover can in particular form an axially inner exterior wall of the housing which faces the rear wheel. The stator cover is advantageously axially flat and can in particular be disk-shaped. If the stator cover forms an assembly structure of the electric motor, such that the electric motor is or can be fastened to the support device directly via the stator cover, the axial thickness of the motor can be reduced.

The stator cover preferably seals the rotor cup tightly enough that dirt and water are prevented from penetrating into the motor housing thus formed. The rotor cup and the stator cover preferably form a shaft seal directly with each other, which is preferably embodied as a non-contact shaft seal, for example in the manner of a labyrinth seal. In order to obtain a shaft seal which encircles the rotational axis of the rotor, the stator cover can comprise a stator sealing web and the circumferential wall of the rotor cup can comprise a rotor sealing web, which overlap each other radially or preferably axially. In order to increase the tightness of the seal, it is advantageous if the stator sealing web or the rotor sealing web circumferentially forms at least one sealing groove, and the other sealing web in each case forms a sealing ring which protrudes into the sealing groove. The shaft seal can also be embodied in even more stages, for example such that each of the two sealing webs forms a sealing groove and a sealing ring which protrudes into the sealing groove of the respective other part. The rotor sealing web and the stator sealing web can overlap each other radially; the rotor sealing web or the stator sealing web can for example be embodied as said sealing groove, which opens radially inwards such that the respective other sealing web protrudes radially into the sealing groove. In order to be able to keep the diameter of the electric motor advantageously small, however, it is preferred if the stator sealing web and the rotor sealing web overlap each other in the axial direction. In this way, the free circumferential edge of the rotor cup which faces the rear wheel can axially protrude into the overlap with the stator sealing web, preferably protruding into the sealing groove situated on the stator cover, in a very simple way which saves space in the radial direction.

Advantageously, the rotor cup together with the stator cover already form a housing of the electric motor which is or can be assembled as an assembly unit. When assembled, a housing part of the motor—namely, the rotor cup—correspondingly rotates when the vehicle is in operation in a way which is visible from the outside. The outside of the rotor cup is therefore preferably smooth over the circumferential wall and base. If, as is preferred, the base of the rotor forms a housing wall which faces axially away from the rear wheel, this wall can also be configured to be optically striking, in order to also emphasize the peculiarity of a rotating motor housing in design terms.

In order to obtain a motor with a small axial thickness, the stator can be constructed such that a thin stator cover is axially arranged directly and closely next to the electromagnetically active part of the stator. A sleeve-shaped bearing region can axially project centrally from the stator cover, i.e. the cover can form a flange which projects from said central bearing region radially and circumferentially around the rotational axis of the rotor. The electromagnetically active part of the stator can be arranged directly on the central bearing region, axially next to the cover. In such embodiments, the axial thickness of the stator can be equal to the sum of the thickness of the stator cover, the axial thickness of the electromagnetically active part of the stator and the axial width of a narrow gap, if a gap is provided between the cover and the electromagnetically active part.

The axial thickness of the rotor can be equal to the axial length of the rotor cup. In preferred embodiments, the axial thickness of the electric motor corresponds to the axial thickness of the electromagnetically active part of the motor plus the thickness of the stator cover and the thickness of the base of the rotor cup and advantageously only one narrow gap in each case, which the electromagnetically active part of the motor can exhibit from the stator cover on one side and from the base of the rotor cup on the other side.

Embodying the electric motor as an external rotor and shaping the rotor as a rotor cup and in particular using the rotor cup directly as an outer motor housing enables a high torque in comparison to internal rotors to be generated at a low rotational speed of the motor and enables the electric motor to be designed to be compact, both radially with respect to its rotational axis and axially. An electric motor with an output which is sufficient for everyday use can be embodied to have an axial thickness of less than 10 cm, advantageously even less than 7 cm, at exterior diameters of the annular cup of less than 20 cm. For a nominal output of for example 500 W, the motor can manage on an overall weight of less than 2 kg. A motor with a nominal output of 500 W, a mass of about 1.6 kg and a thickness of about 40 mm has proven itself in test operations. Correspondingly, an advantageous electric motor with a nominal output of at least 500 W exhibits an axial thickness of preferably less than 10 cm, more preferably less than 7 cm, wherein the rotating outer housing—the annular cup—exhibits an exterior diameter of preferably less than 25 cm, more preferably less than 20 cm. A motor shaft leading out of the motor housing and a motor pinion are not taken into account when specifying the thickness, which is measured from the exterior side of the base of the rotor cup and the opposing exterior side of the stator cover. The motor shaft and the motor pinion are by contrast included when specifying the mass. Apart from the motor shaft which protrudes out of the housing, and the motor pinion which is connected to it rotationally fixed, the motor as a whole preferably has the shape of a simple and at least substantially smooth circular disk and/or flat circular cylinder.

Preferably embodying the electric motor as an external rotor motor advantageously enables the rotational speed of the rotor to be geared down onto the rotational axis of the rear wheel in any way in the motor coupling, preferably using one circumferential traction means in the motor coupling. Gearing down between the rotor and the motor pinion is not required. It is also in accordance with preferred embodiments to transfer the rotational speed of the rotor onto the motor pinion 1:1 and to only gear it downwards in the torque path. The electric motor and the motor coupling are preferably configured such that the rotational speed of the rotor is transferred onto the motor pinion 1:1, preferably via a motor freewheel, and the motor pinion outputs onto the rear wheel in one gearing stage, preferably by means of a toothed belt or as applicable by means of another traction means, for example a chain onto a motor rear wheel pinion arranged on the rotational axis of the rear wheel. Other gearing stages between the motor pinion and the motor rear wheel pinion are advantageously unnecessary. Conversely, however, it is in accordance with preferred embodiments if, as stated further above, a variable gear system is arranged directly on the rear wheel, preferably in a wheel hub, and the rear wheel is driven by the motor via this variable gear system.

The crank drive preferably features gearing-up from a crank pinion onto said crank rear wheel pinion, i.e. the rotational speed of the crank is geared up higher onto the rear wheel within the crank coupling. Advantageously, the motor rear wheel pinion is substantially larger in diameter than the crank rear wheel pinion. Advantageously, the crank pinion which rotates about the rotational axis of the crank is significantly larger in diameter than the motor pinion which rotates with the motor shaft. The rotational speed of the crank is thus geared up and the rotational speed of the electric motor geared down, which—if the electric motor is embodied as an external rotor motor—can advantageously be the case as far as the motor rear wheel pinion, including in only one gearing stage of the electric drive.

In preferred embodiments, a motor output pinion which is arranged on a motor shaft fixedly in terms of torque can be exchanged in a simple way, preferably together with the motor shaft. The ability to exchange it simply is not only advantageous for maintenance and repair work, but also makes it easier to flexibly adapt the gearing-down ratio within the motor coupling to the user's needs. Dealers and even the user himself/herself can very simply and therefore flexibly adapt the motorized drive portion to the personal needs of the respective user. For adaptation, motor pinions can be retained in different sizes and/or with different numbers of teeth and installed or exchanged in situ by the dealer or user. The motor shaft protrudes into—preferably through—a central hollow space of the rotor and preferably also through a housing of the motor. It is axially secured relative to the rotor by means of a releasable axial securing means, for example by means of one or more releasable securing elements. The axial securing means is arranged outside the hollow space, preferably outside the housing of the electric motor. The axial securing means secures the shaft in terms of one of the two axial directions. The securing element(s) of the axial securing means can in particular (each) be formed as a retaining ring. A releasable axial securing means on the motor shaft is preferred for simple exchanging; in principle, however, the motor pinion could instead or additionally be axially secured, releasably, relative to the motor shaft. A motor shaft which can be moved axially out of the hollow space together with the motor pinion in the way described when the axial securing means is released is, however, advantageous with regard to accessibility, in particular in embodiments in which the motor pinion is arranged axially nearer to the rear wheel than the rotor. In these preferred embodiments, the releasable axial securing means can be formed on the side of the hollow space and/or motor housing which faces away from the motor pinion and is easily accessible from the outside.

It is advantageous, not least for the ability of the motor pinion to be exchanged, if the electric motor is in an engagement, which can be loosened, with the support device, wherein the engagement preferably involves a clamping engagement, and the electric motor can be moved relative to the support device when the engagement with the support device is loosened but still extant, and can be blocked in at least one of a number of different positions, preferably in a force fit. The engagement can be developed to form a guiding engagement in which the electric motor is adjustably guided relative to the support device. The engagement can in particular be formed by means of an elongated hole and an assembly element which engages the elongated hole, and more preferably using a number of pairs of such engagement elements. The support device can then comprise one or more elongated holes for one or more assembly elements of the electric motor. Reversing this relationship is likewise conceivable, as is a combination in which both the support device and the motor each comprise at least one elongated hole and at least one assembly element which cooperates with the respective elongated hole. The engagement is formed such that by adjusting the position of the motor relative to the support device while the engagement with the support device is still extant, a distance between the rotational axis of the rotor and the rotational axis of the motor rear wheel pinion can be adjusted, in order for example to be able to tense or relax a traction means of the motor coupling or in particular to use motor pinions of different circumferences with the same traction means.

An electric motor for a wheeled vehicle is also already advantageous in its own right. Such an electric motor comprises a stator and a rotor which cooperates electromagnetically with the stator, can be rotated relative to the stator about a motor axis and comprises a rotor cup which circumferentially surrounds the stator on a facing side and at least on the outer circumference and forms an outer housing of the electric motor which rotates when the electric motor is in operation. While such an electric motor can advantageously be combined with any feature disclosed within the invention claimed here, each in its own right and in any combination of features, it is however also already advantageous itself. While the electric motor can advantageously be arranged in accordance with the invention claimed here, i.e. within a rear frame triangle in the lateral view onto the wheeled vehicle, it can however in principle also be arranged on the wheeled vehicle at a location or in a way other than that described here. Such an electric motor is also advantageous in other uses.

An electric motor for driving preferably a wheeled vehicle is itself also a subject of the invention. The electric motor comprises a stator with an electromagnetically active part and comprises a rotor with a rotor cup which comprises a base and a circumferential wall and surrounds the stator on a facing side with its base and circumferentially on the outside with its circumferential wall. A part of the rotor which electromagnetically cooperates with the stator when the electric motor is in operation is arranged on the circumferential wall of the rotor cup or forms the circumferential wall. The rotor cup forms an outer housing of the electric motor which rotates when the electric motor is in operation.

If the stator forms a stator cover for the rotor cup axially opposite the base of the rotor cup, a particularly compact motor with a motor housing which consists only of the rotor cup and the stator cover can be obtained.

The rotor cup forms outer walls of the motor housing, namely the base on a facing side and the circumferential wall. It forms at least an axial portion of the circumferential wall, preferably at least a predominant part of the axial length of the circumferential wall. The motor housing which is formed by means of the rotor cup encapsulates electromagnetically active parts of the motor in a sufficiently tight seal, in particular in a water-proof seal, for their practical use in typical weather conditions. It can advantageously form the assembly unit already discussed, such that the motor can be assembled or disassembled as a compact, finished design unit or the position of the motor can be adjusted while it is assembled.

In preferred embodiments, the stator comprises a stator support with a central, sleeve-shaped bearing region and a flange region which projects radially outwards from the central bearing region. An electromagnetically active part of the stator, preferably a coil portion of the motor, is arranged on an outer circumference of the bearing region, while the stator and the flange region together form a stator cover for the rotor cup which preferably closes the cup off in a water-proof seal. The rotor cup can comprise a rotor shaft which extends from the base of the rotor cup into the central bearing region of the stator, where it is supported on the stator support such that it can be rotated in both rotational directions.

Preferably, the electric motor is or can be assembled in the region of the stator cover on a support device, preferably on a wheeled vehicle. The stator cover can comprise one or more assembly elements, for example one or more bores or one or more elongated holes or one or more screws, for assembling the electric motor on the support device.

In preferred embodiments, a power source for the electric motor is arranged within the frame, but in front of the seat tube, in the lateral view onto the wheeled vehicle. In preferred embodiments, a front part of the frame—a "front frame"—is formed by the seat tube together with a steering tube, which serves to mount a front wheel fork, and an upper stay and a lower stay. In preferred embodiments, the power source is arranged within the front frame, as seen in the lateral view. In accordance with another advantageous aspect of the invention, a housing of the power source can fill a predominant part of the area enclosed by the seat tube, the steering tube and the two stays; preferably, the housing fills almost the entire area thus enclosed or even does fill the entire area thus enclosed. A power source housing with such a large area can advantageously be embodied to have a small axial thickness. It is preferably only a few centimeters thick, in relative terms at most five times, more preferably at most four times or three times, as thick as the upper stay or lower stay. The upper stay and the lower stay can expediently be embodied as an upper tube and a lower tube. The seat tube also need not necessarily be formed as a tube, although this is expedient. A non-tubular bearing column which supports the seat, preferably a saddle, of the wheeled vehicle is also understood to be a seat tube. This also applies to the seat tube within the invention claimed here. The upper and lower rear wheel stay, on which the electric motor is preferably supported, can in particular likewise be tubular. The handle bars and the suspension of the front wheel are supported on the steering tube.

While a large-area power source housing, arranged in this way, for accommodating a power source is preferably used in combination with the invention claimed here, it is however also already advantageous on its own and in its own right. Consequently, an independent subject of protection within the framework of a possible divisional application can also be a wheeled vehicle comprising:

a) a frame (1-8) which serves to suspend a front wheel (A) and a rear wheel (B) and comprises a seat tube (1), an upper stay (3), a lower stay (4) and a steering tube (2) connected to the seat tube (1) by means of the stays (3, 4);
b) an electrical consumer (20), preferably an electric motor;
c) and a housing (9) for a power source for supplying the consumer (20) with electrical power, wherein
d) the power source housing (9) is arranged in the frame (1-8) between the seat tube (1), the steering tube (2) and the stays (3, 4)
e) and fills a predominant part of the area enclosed by the seat tube (1), the steering tube (2) and the stays (3, 4), as seen in a lateral view.

The wheeled vehicle can be fitted with power sources of different capacities, for example optionally 6, 12, 18 or 24 Ah (amp hours), at a nominal voltage of for example 50 V in each case. The option also advantageously exists of latterly increasing the capacity, for example from an original capacity of 300 Wh (watt hours) to 900 Wh or another size. It is possible to use a system of power sources which differ from each other in their capacity, for example in natural multiples of a minimum capacity of x Wh, i.e. x, 2x, 3x, . . . , nx Wh. They will differ correspondingly with regard to their volume and mass. The power source housing is advantageously large enough and designed to optionally accommodate any of the different power sources, for example either the smallest or the largest. The power sources and the power source housing can in particular also be designed such that two or more power sources, each of a smaller capacity, can be simultaneously arranged in the power source housing and connected together to form a larger-capacity power source, which would enable retro-fitting while continuing to use a power source already provided beforehand.

In accordance with another aspect, the invention also relates to a cycle frame system comprising a first frame and at least one other, second frame which differs in size from the first frame. The different frames of the system differ in the position or inclination which the steering tube exhibits relative to the seat tube. The relative difference in position is due only to the fact that the steering tubes in the different frames are offset parallel to each other, as respectively seen from one of the frames to the other. Such a shift in position can be combined with a difference in the relative inclination. Preferably, however, the steering tubes are only offset parallel to each other if the different frames are compared, one superimposed on the other. The seat tubes in the frames of the system are each identical between the upper stay and the lower stay. The course of the upper stay and the course of the lower stay are likewise identical; given said relative shift in position, the upper stays or lower stays of the different frames differ—preferably, both stays from the other frame in each case—in length only. If the different frames are placed one on top of the other, they thus match over the predominant part of their lengths from the saddle tube towards the steering tube and differ from each other only in the immediate region of the steering tube. Outside the enclosed area, the seat tube can exhibit different lengths between the front frame and the seat. The frames, which are essentially identical in terms of production, can be used to manufacture wheeled vehicles for different-sized riders. Preferably, each of the frames of the system exhibits the same rear section, which can in particular be formed by a simple rear frame triangle, wherein the descriptions given with respect to the rear section within the invention claimed here also preferably apply to the different frames of the system.

Consequently, the subject of a possible divisional application can also be a cycle frame system comprising:

a) a first frame (51) and at least a second frame (52) which is different in size,
b) which each comprise a seat tube (1), an upper stay (3), a lower stay (4) and a steering tube (2) connected to the seat tube (1) by means of the stays (3, 4), and surround a frame area which remains free in the respective frame (51, 52),
c) wherein in each of the frames (51, 52), at least one of the stays (3, 4) extends as far as the steering tube (2), and
d) the frame areas are identical up to the vicinity of the respective steering tube (2)
e) and can be transposed into each other by shifting the steering tube (2) parallel to itself or by rotating the steering tube (2) about an axis which points transverse to the respective frame area.

The upper stay and the lower stay preferably each extend as far as the seat tube of the respective frame (51, 52). The seat tubes are advantageously identical over their length (1a) extending between the stays (3, 4). The upper stay of the first frame (51) can then differ from the upper stay of the second frame (52) only in length and/or the lower stay (4) of the first frame (51) can then differ from the lower stay (4) of the second frame (52) only in length.

It is advantageous if at least one of the following features is fulfilled:

a) the upper stay (3) of the first frame (51) has a different length to the upper stay (3) of the second frame (52), and the upper stays (3) preferably only differ from each other with respect to their length;
b) the lower stay (4) of the first frame (51) has a different length to the lower stay (4) of the second frame (52), and the lower stays (4) preferably only differ from each other with respect to their length;
c) the upper stay (3) and lower stay (4) in each of the frames (51, 52) extend from the seat tube (1) as far as the steering tube (2);
d) the position of the steering tube (2) varies relative to the seat tube (1) in the direction of travel (X) and in the vertical direction (Z);
e) in each of the frames (51, 52), the seat tube (1) comprises an upper portion (1b) which protrudes beyond the upper stay (3) of the respective frame (51, 52), and the upper portion (1b) of the first frame (51) has a different length to the upper portion (1b) of the second frame (52).

In a further development, the steering tube of the first frame itself differs in length, preferably only in length, from the steering tube of the second frame. The length of the steering tube is preferably varied in accordance with the variation in the position of the steering tube described in d), wherein the length is varied such that the variation in the vertical direction is compensated for, i.e. the variation in length equalizes the variation in the vertical position, and front forks of the same length and front wheels of the same size can be respectively used for the different frames.

The reference signs indicated above in brackets with respect to the aspects of the invention refer to the example embodiments which are described below, but do not restrict the respective aspect of the invention and merely serve to facilitate comprehension.

Advantageous features are also described in the sub-claims and combinations of them.

BRIEF DESCRIPTION OF THE DRAWINGS

Example embodiments of the invention are described below on the basis of figures. Features which are disclosed by the example embodiments, each individually and in any combination of features, advantageously develop the subjects of the claims and also the embodiments described above and the other aspects of the invention.

DETAILED DESCRIPTION

Figure 1:
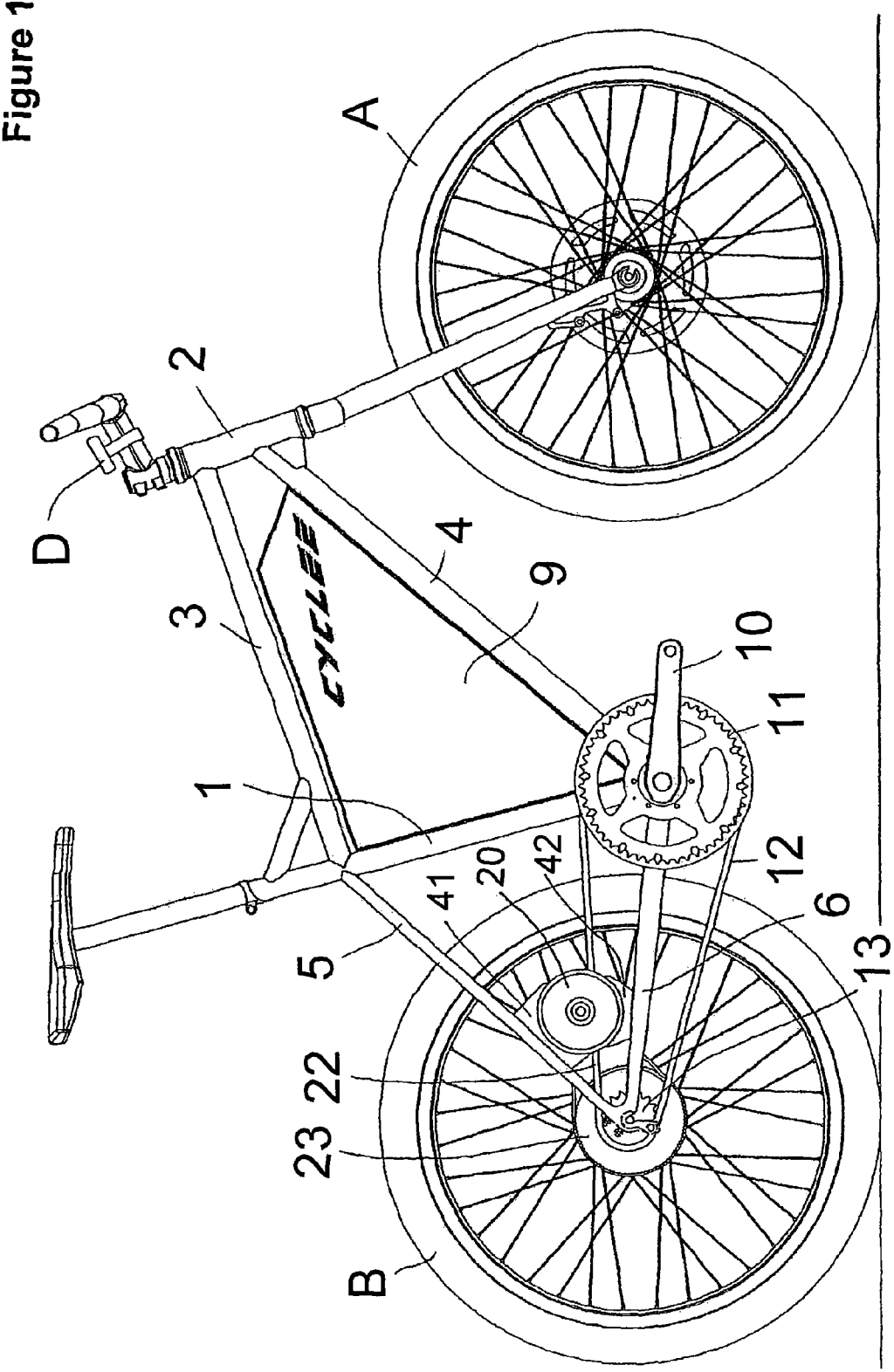
FIG. 1 shows a wheeled vehicle with a crank drive and an electric drive, in a lateral view.

FIG. 1 shows a wheeled vehicle with a crank drive and an electric drive, taking the example of a cycle. A front wheel A and a rear wheel B are suspended on a frame of the wheeled vehicle. The wheeled vehicle features a crank drive comprising a crank 10 which can rotary-drive the rear wheel B via a crank pinion 11, a traction means 12 which is for example formed by a chain, and a crank rear wheel pinion 13. The wheeled vehicle also features an electric drive with an electric motor 20 which can likewise rotary-drive the rear wheel B via a motor pinion which cannot be seen in FIG. 1, a traction means 22 which is for example preferably embodied as a toothed belt, and a motor rear wheel pinion 23. The electric motor 20 is arranged within a rear frame triangle of the frame, as seen in the lateral view shown in FIG. 1. A display for the rider is indicated by D.

The frame comprises—in a way which is known in its own right—a seat tube or saddle tube 1, a steering tube 2, an upper stay 3 preferably in the form of an upper tube and a lower stay 4 preferably in the form of a lower tube, an upper rear wheel stay 5 and a lower rear wheel stay 6. The seat tube 1 divides the frame into a front section on which the front wheel A is suspended, and a rear section on which the rear wheel B is suspended. The front section is embodied as a front frame, and the rear section is embodied as the frame triangle already mentioned. The front frame is thus formed by the seat tube 1, the steering tube 2 and the stays 3 and 4. The rear frame triangle is formed by the seat tube 1 and at least substantially by the rear wheel stays 5 and 6. The stays 3 to 6 are fixedly and rigidly connected to the seat tube 1, preferably each by means of a weld connection. The stays 3 and 4 are likewise fixedly and rigidly connected to the steering tube 2, preferably each by means of a weld connection. The front frame 1-4 comprises an area, for example a quadrilateral area, which is enclosed by the seat tube 1, the steering tube 2 and the stays 3 and 4 and in which a power source, preferably in the form of a rechargeable electrical battery, is arranged for supplying electrical consumers, at least the electric motor 20, with electrical power. The power source is accommodated in a power source housing 9 which is formed in accordance with the enclosed area. The power source housing 9 fills the predominant part of the enclosed area of the front frame 1-4 and can correspondingly be embodied to have a small axial thickness, parallel to the rotational axes of the wheels A and B, such that it does not obstruct the rider during pedaling. Its axial thickness as measured between the exterior sides, which is preferably constant over the entire lateral area, is advantageously at most 10 cm. The thickness is preferably at most four times, ever better at most three times that of the thickest of the frame parts 1 to 4 of the front frame 1-4.

Figure 2:
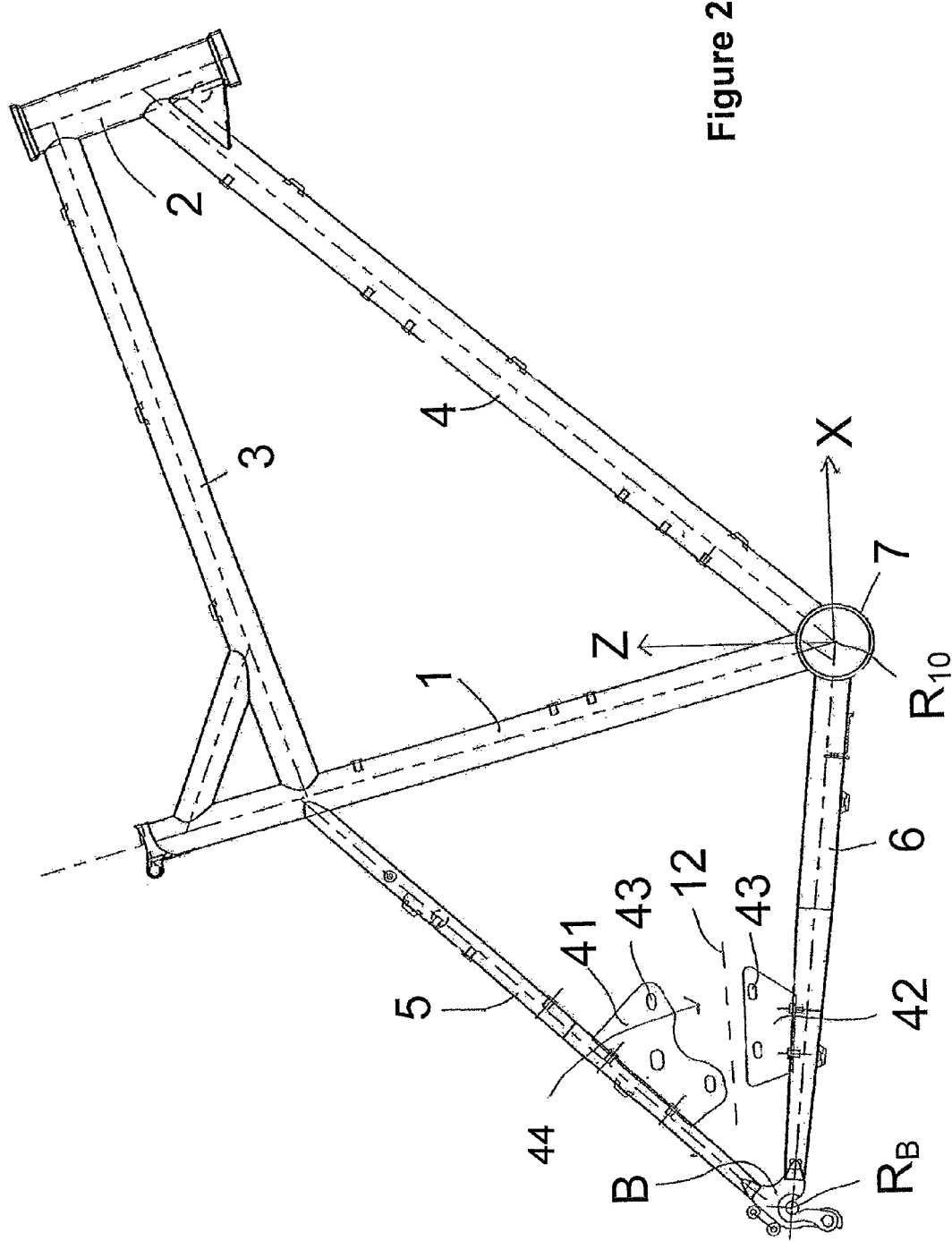
FIG. 2 shows a frame of the wheeled vehicle, in the lateral view.

FIG. 2 shows the frame itself, removed from the wheeled vehicle, likewise in the lateral view. A bottom bracket housing 7 can be seen which is for example preferably arranged at the lower end of the seat tube 1 and at which the seat tube 1, the lower stay 4 and the lower rear wheel stay 6 abut each other. The seat tube 1 and the stays 4 and 6 are each fixedly and rigidly connected, preferably each welded, to the bottom bracket housing 7. The rear wheel stays 5 and 6 converge towards the rotational axis $R_B$ of the rear wheel B and are fixedly connected to each other in the immediate vicinity of the rotational axis $R_B$ via a suspension structure 8 which comprises a lug which is open downwards in order to accommodate the rear wheel axis, and are preferably each welded to the suspension structure 8. Two other such rear wheel stays 5 and 6 are arranged on the other side of the rear wheel B together with another such suspension structure 8 which cannot however be seen in the lateral view because they are covered by the right-hand stays 5 and 6 shown. Fastening points for the housing of the power source 9 can also be seen in the region of the front frame 1 to 4. Fastening points are provided on each of the seat tube 1 and the stays 3 and 4; the steering tube 2 is free of fastening points.

As can be seen in FIG. 1, the electric motor 20 is supported on both the upper rear wheel stay 5 and the lower rear wheel stay 6 by means of a support device, which ensures that the electric motor 20 is fixedly and rigidly mounted. As can be seen in FIG. 2, the support device is divided into two and comprises an upper support 41 and a lower support 42 which is separate from the upper support 41. The electric motor 20 is connected to the two supports 41 and 42 and fixedly connected to the upper rear wheel stay 5 by means of the upper support 41 and fixedly connected to the lower rear wheel stay 6 by means of the lower support 42. The supports 41 and 42 are for example connected to the respective rear wheel stay 5 and 6 by a screw connection. The sub-division into the upper support 41 and the lower support 42 sub-divides the support device 41, 42 such that the upper run of the traction means 12, which couples the crank 10 to the rear wheel B, extends within a space 44 which remains free between the supports 41 and 42, as seen in the lateral view. The traction means 12 is indicated in FIG. 2 by a dashed line.

The supports 41 and 42 are each provided with multiple elongated holes 43, for example two elongated holes 43 each. The elongated holes 43 serve to fasten the electric motor 20 and allow the electric motor 20 to be adjusted relative to the supports 41 and 42 while assembled, after its fastening to the supports 41 and 42 is merely loosening.

Figure 3:
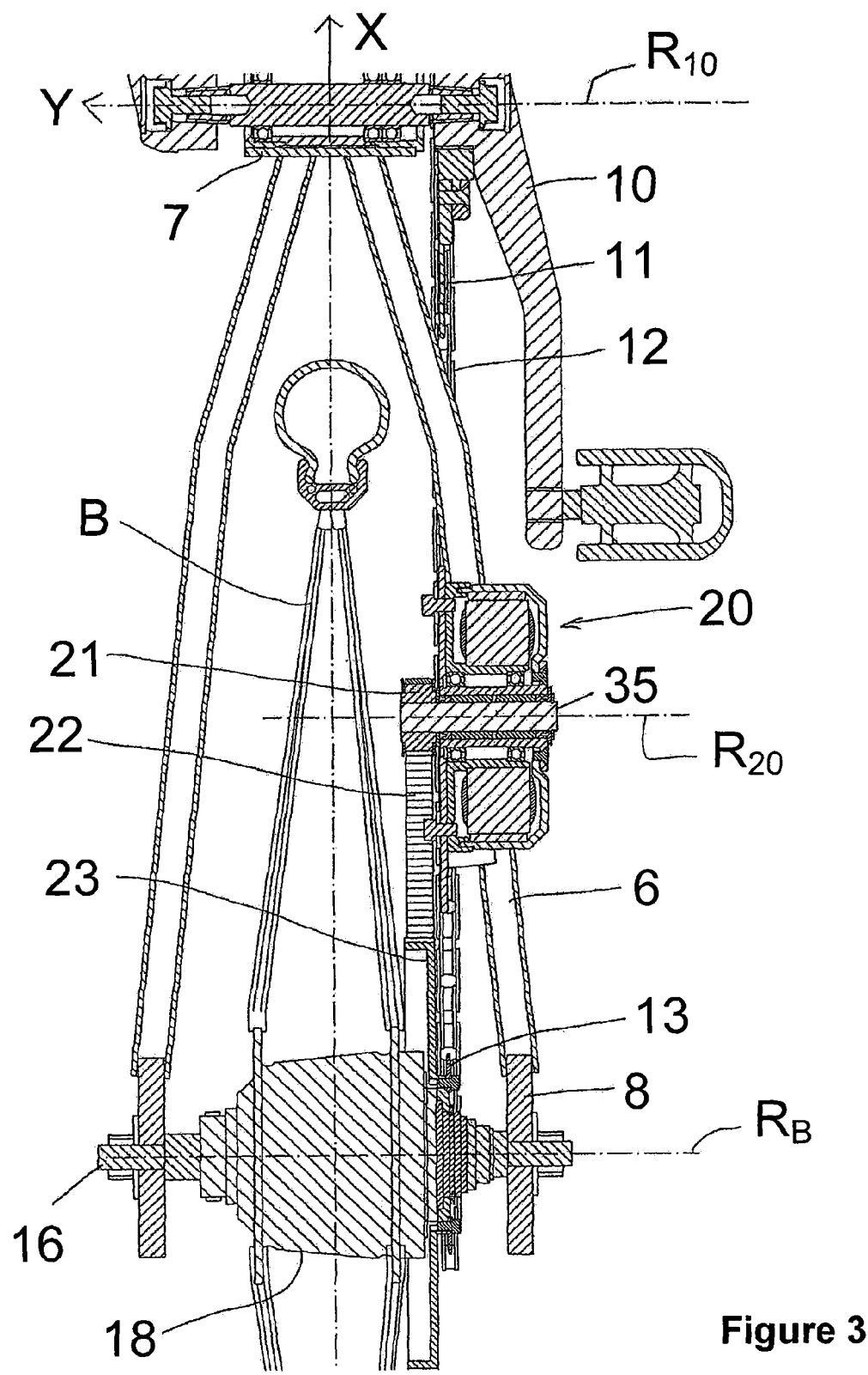
FIG. 3 shows a rear part of the wheeled vehicle, in a longitudinal section.

FIG. 3 shows the rear part of the wheeled vehicle in a longitudinal section which extends through the rotational axis $R_B$ of the rear wheel B, the motor axis $R_{20}$ and the crank axis $R_{10}$ and linearly between the rotational axes. It can be seen that, as is preferred but nonetheless only an example, the electric motor 20 protrudes between the rear wheel stays 5 and 6 which support the motor 20, not only in the lateral view of FIG. 1 but also axially, parallel to the rotational axes of the wheels A and B, i.e. it axially overlaps with them in the transverse direction Y of the wheeled vehicle. The motor coupling, which couples the electric motor 20 to the rear wheel B in a way which transfers torque and which is formed by the motor pinion 21, the traction means 22 and the motor rear wheel pinion 23, is arranged next to the crank coupling, formed by the crank pinion 11, the traction means 12 and the crank rear wheel pinion 13, nearer to the rear wheel B than the crank coupling 11-13. The crank traction means 12 extends further on the outside than the motor traction means 22. However, the electric motor 20 protrudes axially outwards beyond the crank traction means 12. The entire electromagnetic part of the electric motor 20 is for example preferably situated in front of the traction means 12 on the outside. Consequently, a motor shaft 35 which together with the motor pinion 21 forms a rotational unit extends from the outside beyond the crank traction means 12, towards the rear wheel B.

As can best be seen in FIG. 1, the electric motor 20 is arranged in the rear frame triangle B, near enough to the rotational axis $R_B$ of the rear wheel B that it also overlaps with the upper run of the crank traction means 12 in the lateral view, i.e. it axially covers the outside of the portion of the traction means 12 extending between the supports 41 and 42. Because it is arranged near to the rotational axis $R_B$ in this way, the connection between the electric motor 20 and the upper rear wheel stay 5, as also the connection to the lower rear wheel stay 6, can be embodied to have a small length, which benefits the rigidity with which the electric motor 20 is mounted. As shown in FIG. 2, the two supports 41 and 42 are bluntly short. Because the support device 41, 42 is divided, the interior side of a housing of the electric motor 20 which faces the rear wheel B can extend axially as far as the immediate vicinity of the crank traction means 12. At least a part of the axial width of the traction means 12 can pass between the supports 41 and 42, not only as seen in the lateral view but also as seen axially. The electric motor 20 is arranged near enough to the rotational axis $R_B$ of the rear wheel B and is narrow enough as seen radially with respect to the motor axis $R_{20}$ that it lies outside the crank circle and cannot come into contact with the crank 10 during pedaling. The arrangement and dimensions of the electric motor 20 are advantageously chosen such that it also does not come into contact with the rider's foot on the pedal during pedaling. The small axial thickness of the electric motor 20 is beneficial in this respect. Its axial thickness is only a few centimeters, preferably less than 10 cm. In addition to the small thickness, arranging the motor coupling 21-23 on the inside of the crank coupling 11-13 is also favorable in this regard.

Figure 4:
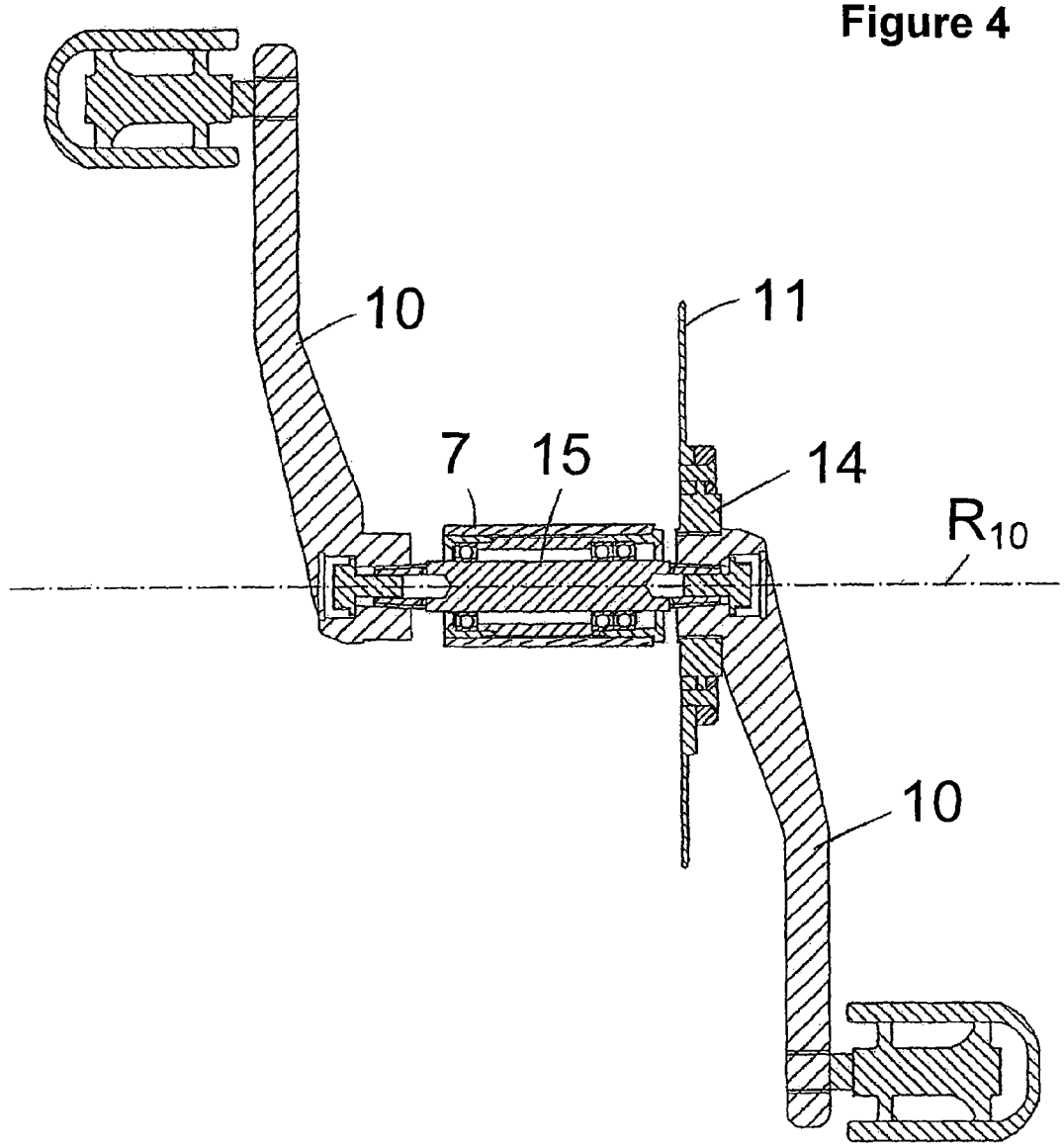
FIG. 4 shows the crank drive in the region of the crank, in a longitudinal section.

FIG. 4 shows a bottom bracket of the wheeled vehicle in a longitudinal section which includes the rotational axis $R_{10}$. The two cranks 10 are connected to each other in a way which transfers torque via a crank shaft 15 which leads through the bottom bracket housing 7. The torque of the cranks 10 is combined on the crank shaft 15 and transferred onto the crank pinion 11 in a drive rotational direction via a crank freewheel 14. Apart from unavoidable friction forces, the freewheel 14 does not transfer any torque counter to the drive rotational direction. The crank pinion 11 can thus rotate faster than the crank shaft 15 in the drive rotational direction, but cannot perform any rotational movement relative to it counter to the drive rotational direction.

Figure 5:
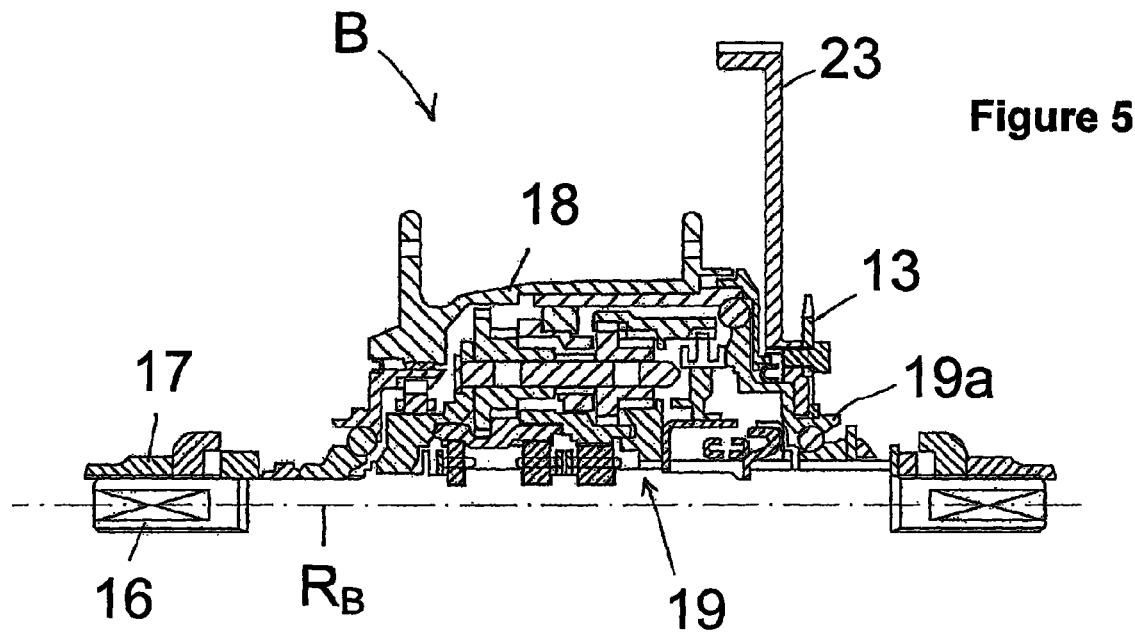
FIG. 5 shows a rear wheel of the wheeled vehicle in the region of the rear wheel hub, in a partial longitudinal section.

FIG. 5 shows the central region of the rear wheel B, in a longitudinal section. Only one half of the longitudinal section is shown. The wheel axis 16 of the rear wheel B is accommodated in the suspension, for example the suspension structure 8 (FIG. 2), formed by the frame 1-8 and is secured by means of a left-hand and a right-hand securing element 17 which can be formed as threaded nuts, as is usual. A variable gear system 19, in the form of a shifting gear system, is arranged in a hub 18 of the rear wheel B. The gear system 19 is embodied as a planetary gear system, as is preferred although only an example. The two rear wheel pinions 13 and 23 are connected non-rotationally to a common gear input member 19a of the gear system 19, such that the pinions 13 and 23 rotate together with the gear input member 19a as a rotational unit when a torque of the crank 10 acts via the crank rear wheel pinion 13 or a torque of the electric motor 20 acts via the motor rear wheel pinion 23. The wheel axis 16, which cannot be rotated relative to the frame 1-8, forms the support member or actuating member of the gear system 19, and the wheel hub 18 forms the output member which can be rotationally moved relative to it. Since the motor 20 drives the rear wheel B via its internal gear system 19, the rotational speed of the motor 20 can be geared down again, in addition to the preferably only single-stage gearing reduction within the motor coupling 21-23, wherein the gearing-down ratio can even be variably selected in accordance with the crank drive.

Figure 6:
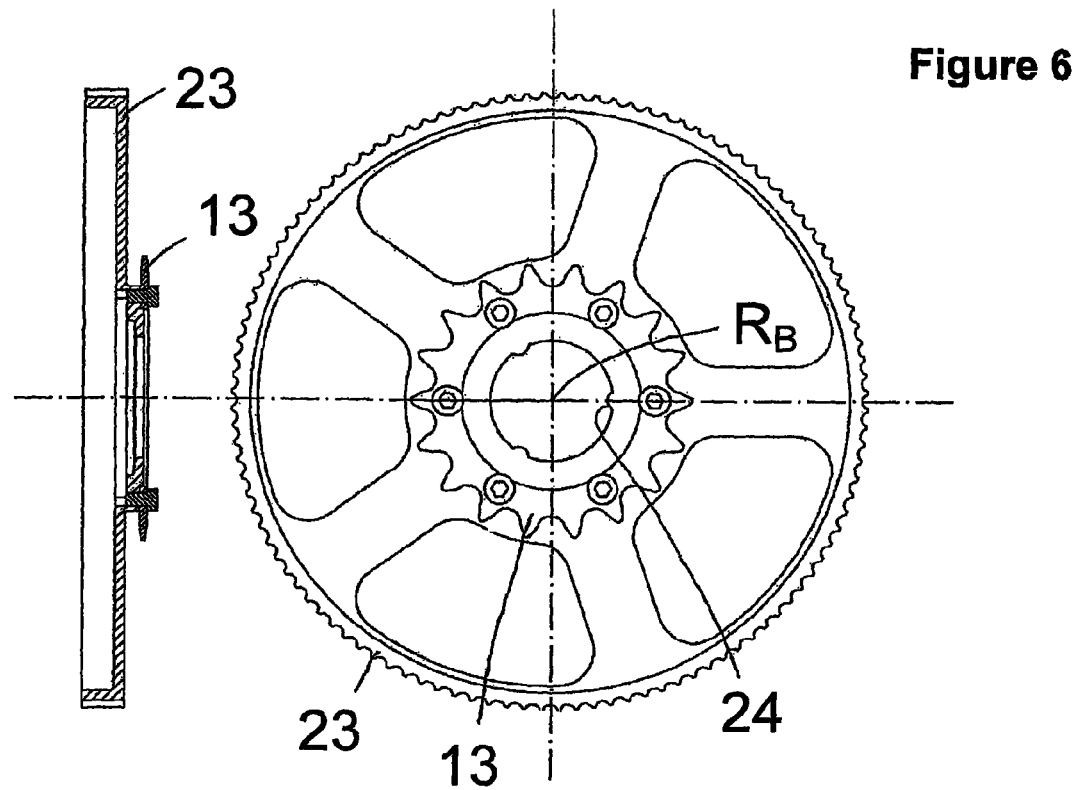
FIG. 6 shows a double pinion consisting of a crank rear wheel pinion and a motor rear wheel pinion.

FIG. 6 shows the rear wheel pinions 13 and 23 themselves, when not assembled. The pinions 13 and 23 are combined to form a unit. They form an assembly unit with each other and, when assembled, a rotational unit with the gear input member 19a. They are for example screwed to each other, but could alternatively also for example be connected to each other in a material fit and, if possible in terms of production, could also be formed in one piece. In the example embodiment, the motor rear wheel pinion 23 serves to fasten the double pinion 13, 23 formed from the two pinions 13 and 23. The crank rear wheel pinion 13 is screwed onto the interior motor rear wheel pinion 23. For the purpose of connecting it rotationally fixed to the common gear input member 19a, an interior side of the double pinion 13, 23—in the example embodiment, the motor rear wheel pinion 23—comprises projections 24 which protrude radially inwards towards the rotational axis $R_B$ and engage with corresponding axial grooves of the gear input member 19a and, when engaged, introduce the torque into the gear input member 19a in a positive fit. The rear wheel B can be a conventional rear wheel, since it does not need to be adapted to the electric drive. The crank rear wheel pinion 13 can in particular be a conventional crank rear wheel pinion.

In an alternative double pinion 13, 23 in which the assembly relationship is reversed, the crank rear wheel pinion 13 can be the assembly pinion and the motor rear wheel pinion 23 can be connected to the gear input member 19a only via the pinion 13. If a conventional crank rear wheel pinion 13 can be used, the motor rear wheel pinion 23 can be simplified in the alternative embodiment. Since the crank rear wheel pinion 13 is usually a steel pinion, and the motor rear wheel pinion 23 is preferably a light-metal pinion, made for example of aluminum or an aluminum alloy, reversing the assembly relationship would also be advantageous with regard to resilience.

Because the crank drive and also the motor drive output onto the same gear input member 19a, the shifting gear system 19—the gear hub—is used equally for both drives. Another advantage for handling is that the rider only has to deal with one gearshift. There is also no freewheel arranged on the rotational axis $R_B$ of the rear wheel B; the crank freewheel 14 and also a motor freewheel are spaced from the rotational axis $R_B$. This has the advantage that a freewheel does not have to be accommodated in the but limited available space next to the wheel hub 18, which makes it easier to integrate the crank drive and the electric drive.

The outer circumference of the motor rear wheel pinion 23 comprises a toothing which exhibits a significantly finer tooth pitch than the crank rear wheel pinion 13. In preferred embodiments, the toothing of the pinion 23 exhibits a modulus d/z<1.2, where d is the diameter of the pitch circle and z is the number of teeth of the pinion 13. Small, in particular short teeth are advantageous for reducing wear and noise in the motor coupling 21, 22 and 23. A toothed belt, advantageously a flat toothed belt, can be used as the traction means 22. A carbon belt, i.e. a plastic belt which is reinforced with carbon fibers, is preferably used.

Figure 7:
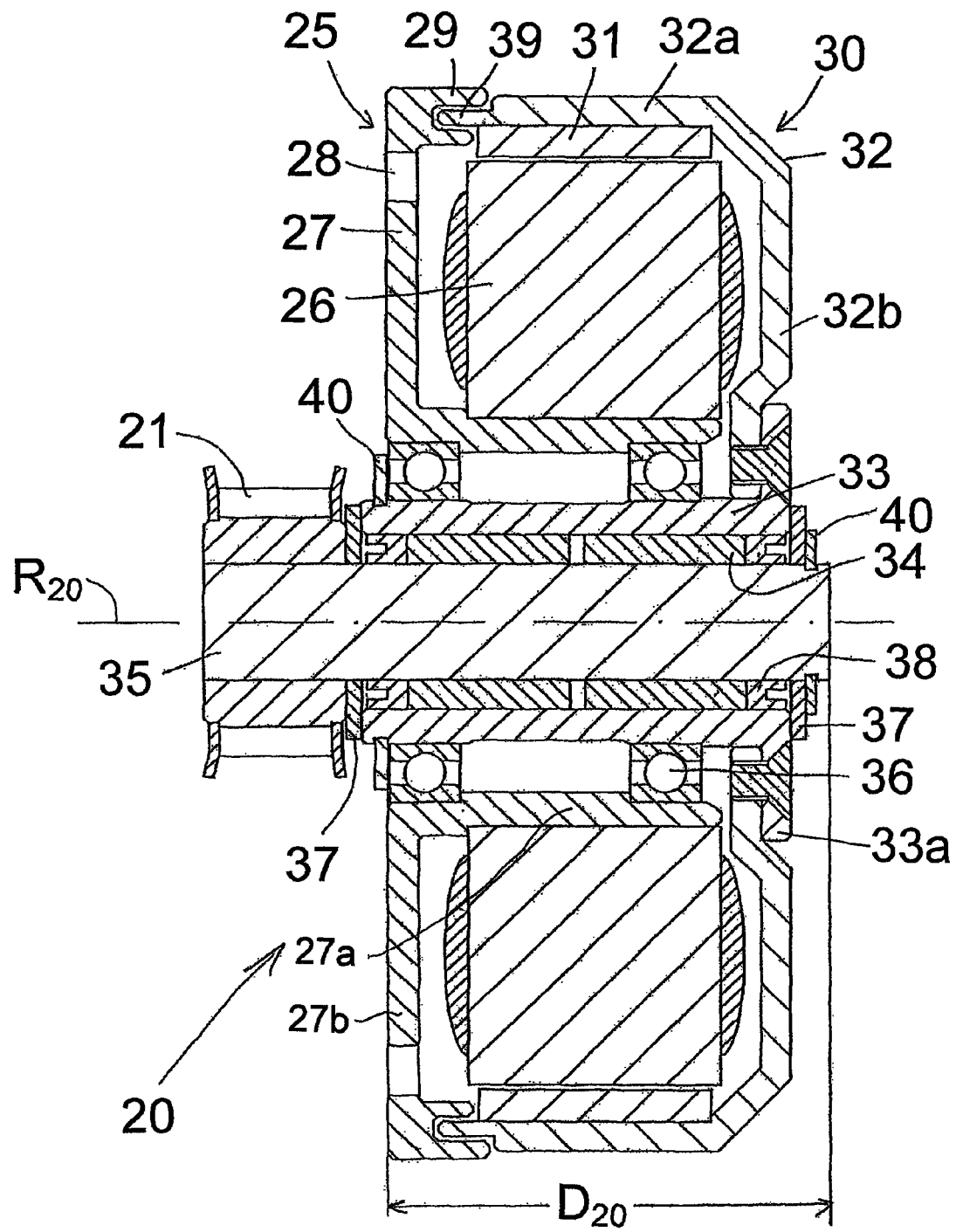
FIG. 7 shows an electric motor of the electric drive, in a longitudinal section.

FIG. 7 shows the electric motor 20 itself, removed from the frame 1-8, in a longitudinal section which includes the motor axis $R_{20}$. The electric motor 20 comprises a stator 25 which, when assembled, is fixedly connected to the frame 1-8, i.e. fixedly connected to the rear wheel stays 5 and 6 (FIG. 1) via the supports 41 and 42, and a rotor 30 which can be rotated about the motor axis $R_{20}$ relative to the stator 25. The rotor 30 comprises a rotor support 32 for a pole ring 31. The rotor support 32 forms a magnetic return ring 32a which surrounds the pole ring 31 radially on the outside. The pole ring 31 is formed by a plurality of permanent magnets which are arranged in a distribution over the circumference, for example on an interior side of the magnetic return ring 32a, in an alternating pole sequence. The pole ring 31 directly surrounds a coil portion 26—i.e. the field winding—of the stator 25, while leaving a narrow annular gap free. One axial end of the magnetic return ring 32a is connected, via a connecting portion 32b, to a rotor shaft 33 in such a way that it is fixed against rotating about the motor axis $R_{20}$ in relation to both directions of a rotational movement.

The rotor 30 forms a rotor cup. The magnetic return ring 32a forms a circumferential wall in the region of the pole ring 31, and its connecting portion 32b which faces away from the rear wheel B forms a base of the rotor cup. More specifically, an annular cup is formed by the magnetic return ring 32a, the connecting portion 32b and the rotor shaft 33 which is fixedly connected to it. The motor shaft 35 extends into this annular cup, for example through the annular cup, i.e. into and/or through the rotor shaft 33. The coil portion 26 is fixedly connected, such that it cannot be moved, to a stator support 27 which serves to fasten the electric motor 20 to the frame 1-8. The stator support 27 comprises a central, sleeve-shaped bearing region 27a, with an outer circumference on which the coil portion 26 is arranged, and a flange region 27b which projects radially outwards from the central bearing region 27a in the shape of a disk and in the region of which the electric motor 20 is connected to the support device 41, 42 or can be assembled. Multiple assembly elements 28, for example passages for screws, are arranged in the flange region in order to releasably connect the motor 20 to the support device 41, 42 by means of other assembly elements, for example nuts.

The rotor shaft 33 extends from the axially outer connecting portion 32b of the magnetic return ring 32a, as seen from the rear wheel B, i.e. from the base 32b of the rotor cup 31-33, into the central bearing region 27a of the stator cover 27, where it is rotatably supported on the stator support 27 by means of rotary bearings 36. The rotor shaft 33 comprises a connecting flange 33a, in the region of which it is fixedly but releasably connected, for example screwed, to the connecting portion 32b. The rotary bearings 36 are arranged in an annular gap between the rotor shaft 33 and the central bearing region of the stator support 27 which surrounds the rotor shaft 33. The rotor shaft 33 preferably for example extends through the stator support 27 and beyond the stator support 27 towards the rear wheel B. The motor shaft 35 extends through the rotor shaft 33 and is axially secured relative to the rotor shaft 33 at its outer axial end by means of a securing element 40, for example a securing ring. On the inside, another such securing element 40 secures the rotor shaft 33 on the rotary bearing 36 there. The securing elements 40 are preferably releasable. A motor freewheel 34 is arranged in the annular gap between the two shafts 33 and 35. The motor freewheel 34 transfers the torque of the electric motor 20 onto the motor shaft 35 in one drive rotational direction, but does not transfer any torque in the opposite rotational direction, apart from unavoidable friction forces. The motor freewheel 34 is arranged in an annular gap between the motor shaft 35 and the rotor shaft 33 which surrounds it. The freewheel 34 can in particular be formed as a sleeve freewheel. WO 2009/127263 A1 and PCT/EP2009/055308 which have already been mentioned are for example referenced again with respect to advantageous features of the motor freewheel 34. The motor shaft 35 is supported on the rotor shaft 33 via the motor freewheel 34 and a left-hand and right-hand thrust washer. The motor pinion 21 is connected rotationally fixed to the motor shaft 35, i.e. they form a rotational unit. A left-hand and right-hand sealing element which seal the gap with the freewheel 34 are indicated by 38.

The stator 25 together with the rotor 30 directly form the housing of the electric motor 20. The latter does not feature any other housing structure for covering the coil portion 26 and the pole ring 31. More specifically, the rotor support 32 and the rotor shaft 33 on the rotor side and the stator support 27 on the stator side form the motor housing. In this embodiment of the housing, the rotor cup formed by the rotor support 32 and the rotor shaft 33 is an outer rotational housing which is rotated when the electric motor 20 is in operation. In particular, the flange region 27B of the stator support 27 forms a stator cover 27 for the rotor cup 32, 33 which rotates relative to it when the motor is in operation. In the central region, this also results in a nested arrangement of the rotor shaft 33 and the sleeve-shaped central region of the stator cover 27.

The rotor cup and the stator cover and a shaft seal which acts in a non-contact way ensure that the motor housing formed from the rotor cup 32, 33 and the stator cover 27 is externally sealed. The shaft seal is formed by a sealing web 29 of the stator 25 which encircles the motor axis $R_{20}$ and by a sealing web 39 of the rotor 30 which cooperates with the sealing web 29 of the stator 25, forming a seal. The sealing web 29 is circumferentially formed radially on the outside of the flange region of the stator support 27. The sealing web 39 of the rotor 30 forms a free outer circumferential edge of the circumferential wall 32a of the rotor cup 32, 33. The sealing web 29 circumferentially comprises a groove—a sealing groove—which is open towards the sealing web 39 and into which the sealing web 39 protrudes. The sealing webs 29 and 39 cooperate to form a labyrinth seal. It should also be noted that the sealing web 39 of the rotor 30 protrudes into the correspondingly facing sealing groove of the sealing web 29 in the axial direction. Because the shaft seal 29, 39 is aligned in this way, the interior side of the circumferential wall 32a of the rotor cup 32, 33 can simply smoothly taper axially towards the free end, the sealing web 39, which facilitates attaching the pole ring 31 or the individual magnets which form the pole ring 31 to the interior side of the circumferential wall 32a. If the motor housing is provided directly by the stator 25 and the rotor 30, this helps to reduce the size of the electric motor 20. The diameter of the pole ring 31 can be as large or almost as large as the exterior diameter of the electric motor 20. The ratio of the electromagnetically relevant diameter—in this case, the pole ring 31—to the exterior diameter of the motor housing can be maximized. This can increase the nominal torque of the electric motor 20 at given outer dimensions, which in turn enables the rotational speed to be reduced and the electric drive to thus be more simply adapted to the crank drive.

Figure 8:
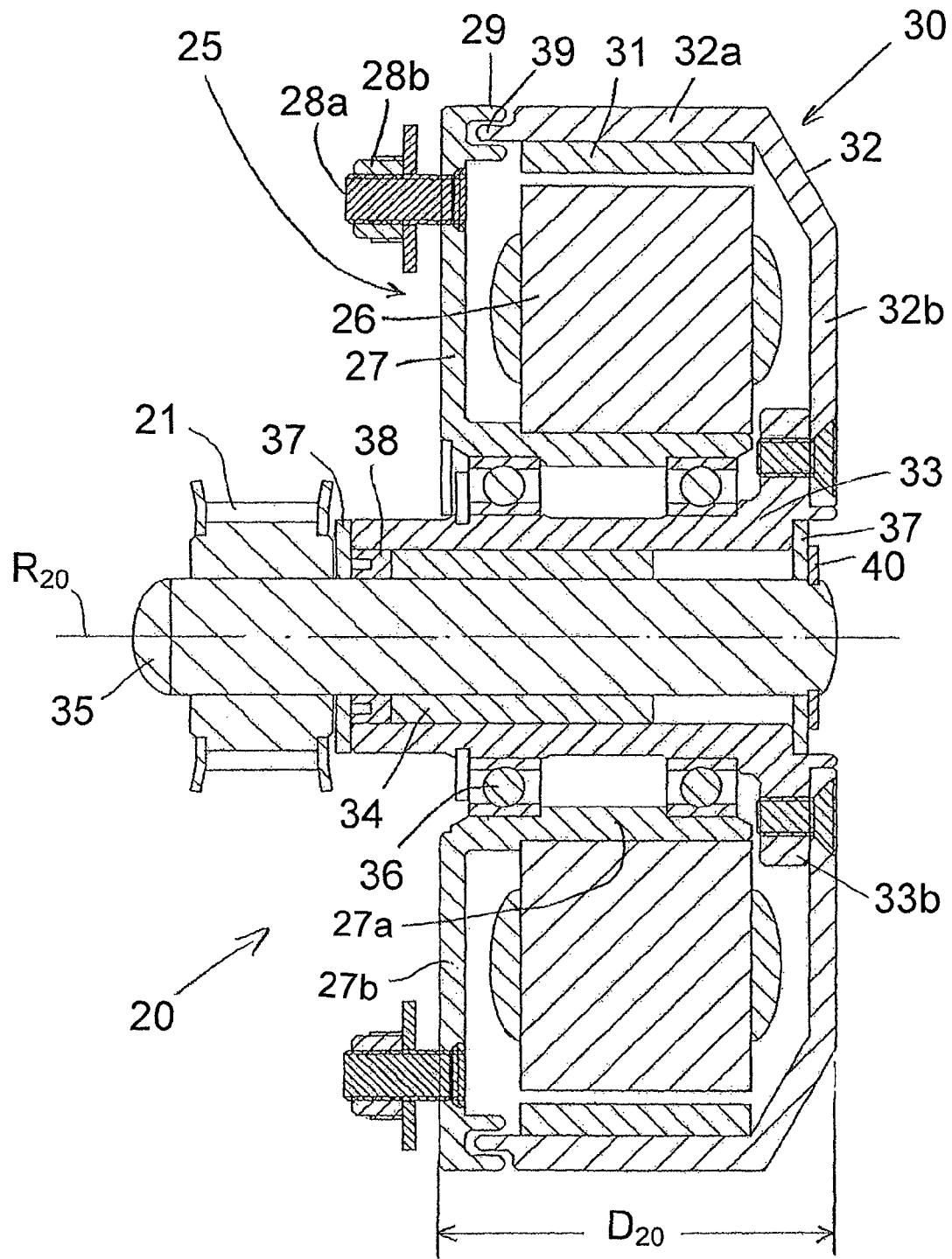
FIG. 8 shows a modified electric motor of the electric drive, in a longitudinal section.

FIG. 8 shows a modified electric motor 20. The reference signs of the motor 20 in FIG. 7 are used for functionally identical components of the motor. The modified motor 20 deviates from the motor 20 of FIG. 7 with regard to forming the rotor cup 32, 33; more specifically, with regard to connecting the rotor support 32 and the rotor shaft 33. The connecting portion 32b of the rotor support 32 overlaps the connecting flange of the rotor shaft 33, namely axially on the outside. The connecting flange is therefore indicated by 33b in order to distinguish it. Due to the modification, the rotor support 32 together with the pole ring 31 can simply be axially drawn off outwards from the stator 25 once the connection to the connecting flange 33b has been released, wherein the connection is for example again formed as a screw connection. This facilitates maintenance and repair work, for example at the coil portion 26 or the pole ring 31, wherein the stator 25 can remain on the frame 1-8. If different pole rings 31 or complete pole ring and rotor support units 31, 32 are provided, the arrangement also enables the motor 20 to be simply and flexibly converted. The pole ring 31 can thus be provided in different variants, individually or in a unit consisting of the pole ring 31 and the rotor support 32, wherein the variants can differ in the strength of the magnets used. The customer can simply increase the output of the motor 20 latterly by exchanging the original, weaker variant for a stronger variant. The customer likewise has a choice at the time of purchase, wherein the pole ring 31—preferably, the unit consisting of the pole ring 31 and the rotor support 32 which is provided by the manufacturer—can be installed or correspondingly ordered by the dealer.

The assembly has also been modified. The assembly elements 28, which in the motor 20 of FIG. 7 are simply passages in the stator support 27, have been replaced with assembly elements 28a which are connected, preferably fixedly, to the stator support 27 and protrude inwards from the stator support 27 towards the rear wheel B and are for example formed by screws. If assembled on the support device 41, 42, the motor 20 is positioned by means of the assembly elements 28a, wherein the assembly elements 28a protrude through corresponding passages of the support device 41, 42. The assembly elements 28a are then secured by means of other, cooperating assembly elements 28b, for example nuts, and the motor 20 is thus fastened to the support device 41, 42. Except for the differences described, the modified motor 20 corresponds to the motor 20 of FIG. 7.

The motor pinion 21 can be exchanged in a simple way. This is not only advantageous for maintenance and repair work, but also facilitates adapting the degree of motor assistance to the user's needs. For adaptation, motor pinions 21 can be retained in different sizes and/or with different numbers of teeth and installed or exchanged in situ by the dealer or user. The motor shaft 35 is detachably assembled in order to be simple to exchange. The outer securing element 40, which is arranged—releasable and easily accessible—on the side of the electric motor 20 facing away from the rear wheel B (to the right of the stator-rotor array 25, 30 in each of FIGS. 7 and 8), ensures that the motor shaft 35 is releasable. The outer securing element 40 can in particular be formed by a retaining ring which can be moved, against its own spring force, out of its seating. Preferably, both securing elements 40 are releasable, for example each formed as a retaining ring. Once the outer securing element 40 has been released, the motor shaft 35 can simply be drawn out of the motor 20—in the example, out of the rotor shaft 33—together with the motor pinion 21 which is connected, secured against rotation, to the shaft 35, towards the side of the motor pinion 21, wherein the motor freewheel 34 remains in the motor 20 and/or rotor shaft 33. A motor shaft 35 with a different motor pinion 21 can then be re-inserted instead and secured by means of the outer securing element 40. In the chosen arrangement in which the electric motor 20 overlaps with the rear wheel B, the shaft 35 is drawn off through the spokes of the rear wheel B and the shaft with the new pinion 21 is inserted through the spokes of the rear wheel B. The rear wheel B can, but need not, be detached for this purpose.

Fastening the electric motor 20 by means of the elongated holes 43 (FIG. 2) is also advantageous for changing the motor pinion 21 simply. This fastening allows the distance which the rotational axis $R_{20}$ of the motor 20 exhibits from the rotational axis $R_B$ of the rear wheel B to be altered, by loosening but not releasing the fastening of the electric motor 20 to the supports 41 and 42 which is effected by means of the elongated holes 43 and the assembly elements, for example the assembly elements 28a and 28b, which cooperate with the elongated holes 43. When loosened but still held on the supports 41 and 42 and then guided along the elongated holes 43, the electric motor 20 and together with it the motor pinion 21 can be adjusted in the direction of the longitudinal extension of the elongated holes 43, for example in order to adjust the tension of the traction means 12 or in order to adapt to different-sized motor pinions 21. The shaft 35 can be drawn out of the motor 20, together with the pinion 21. Once the previous or preferably a new motor shaft 35 with a new pinion 21 has been inserted, said shaft 35 is secured by means of the outer securing element 40, and the motor 20 is adjusted in the elongated holes 43 in the but loosened engagement which still exists with the supports 41 and 42, until a sufficient tension of the traction means 12 is established. Lastly, the motor 20 is again secured in the holding engagement with the supports 41 and 42 by means of the assembly elements, for example the assembly elements 28a and 28b.

Figure 9:
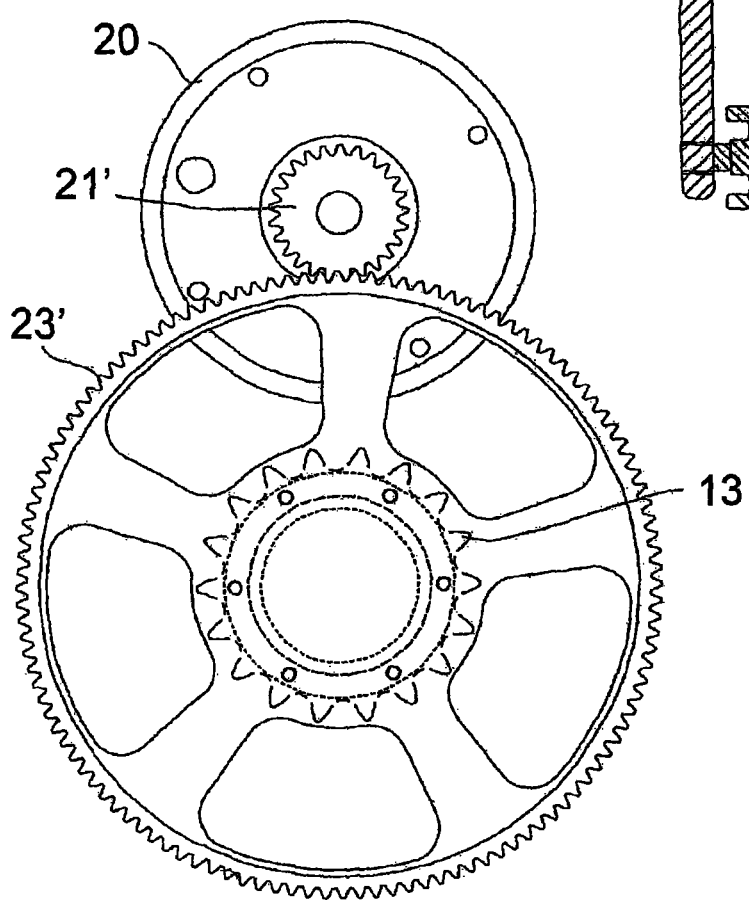
FIG. 9 shows a motor coupling in an alternative embodiment

FIG. 9 shows a motor coupling which can be used as an alternative to the motor coupling 21, 22 and 23 and which is not formed as a traction means drive but rather as a spur wheel gear system. The spur wheel gear system comprises an externally toothed motor pinion 21' and a motor rear wheel pinion 23' situated in toothed engagement with it, which on their own already form the alternative motor coupling with each other. Both the preferred motor coupling 21-23 on the one hand and the motor coupling 21', 23' on the other hand are single-stage motor couplings. In each case, the rotational speed of the electric motor 20 is geared down in only one gearing stage and transferred onto the gear input member 19a (FIG. 5) via the respective motor rear wheel pinion 23 or 23' which simultaneously forms the gear output pinion. Embodying the electric motor 20 as an external rotor motor enables such a simple motor coupling which gears down in only one gearing stage.

Figure 10:
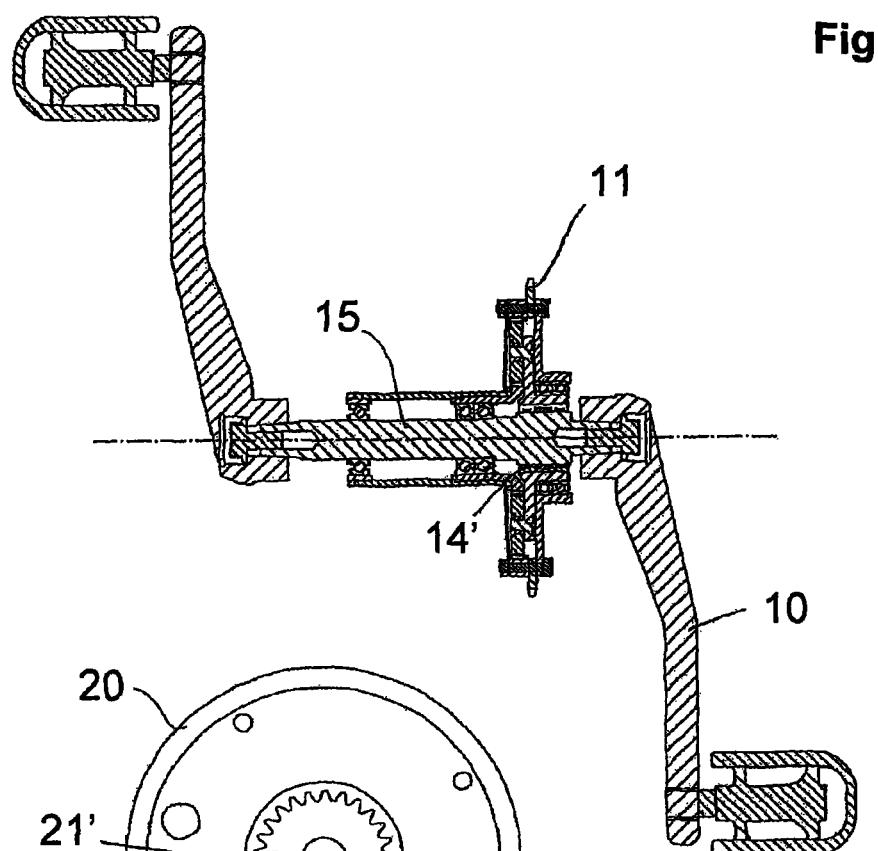
FIG. 10 shows a further-developed crank drive.

FIG. 10 shows an alternative crank drive in which a transmission gear system, preferably for example a planetary gear system, is integrated in the region of the crank 10. The transmission gear system can preferably be a shifting gear system or however can simply transfer the rotational speed of the crank shaft 15 onto the crank pinion 11 always with the same transmission. The transmission gear system is arranged in the torque flow between the crank shaft 15 and the crank pinion 11 and thus transfers the torque of the crank shaft 15 onto the crank pinion 11. A freewheel 14' is again arranged on the rotational axis $R_{10}$, between the crank shaft 15 and the crank pinion 11.

Figure 11:
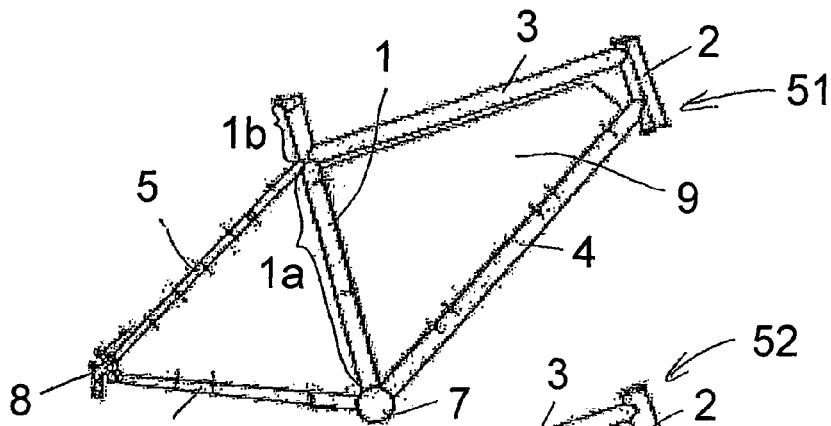
FIG. 11 shows a first frame of a cycle frame system.
Figure 12:
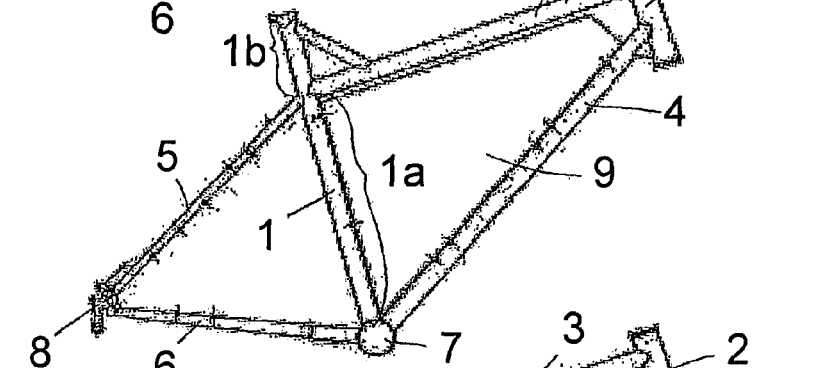
FIG. 12 shows a second frame of the cycle frame system.
Figure 13:
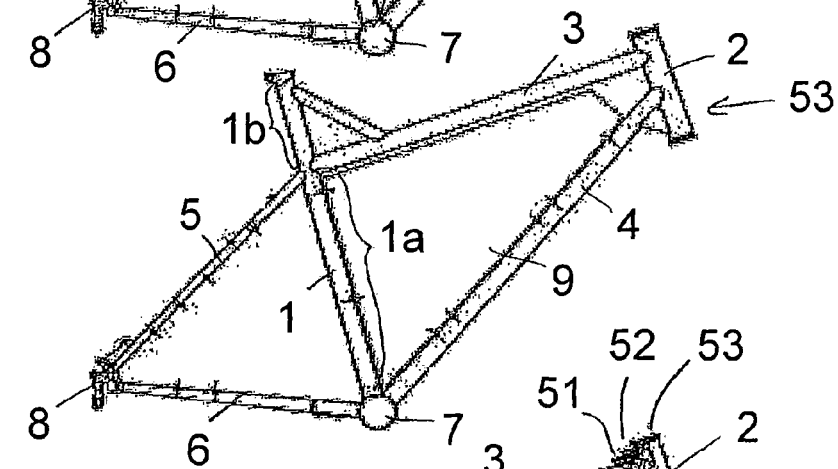
FIG. 13 shows a third frame of the cycle frame system.

FIGS. 11, 12 and 13 show three frames 51, 52 and 53 of a frame system. The frames deviate from each other only in a few features. The areas of the front frames which remain free in the frame and are enclosed by the respective seat tube 1, steering tube 2 and stays 3 and 4 are in particular congruent, i.e. superimposable, except for a small region directly at the steering tube 2. With respect to the enclosed areas, the frames differ from each other only in the arrangement of the respective steering tube 2. The difference is due to the fact that the steering tube 2 is shifted parallel to itself, such that the steering tube 2 of the top frame 51 is nearer to the seat tube 1 of the same frame than the steering tube 2 of the middle frame 52 and the steering tube 2 of the bottom frame 53 are to the seat tube 1 of the same frame in each case. This results in three different frame sizes, with the top frame 51 as the smallest, the middle frame 52 as the medium-size frame and the bottom frame 53 as the largest frame.

Figure 14:
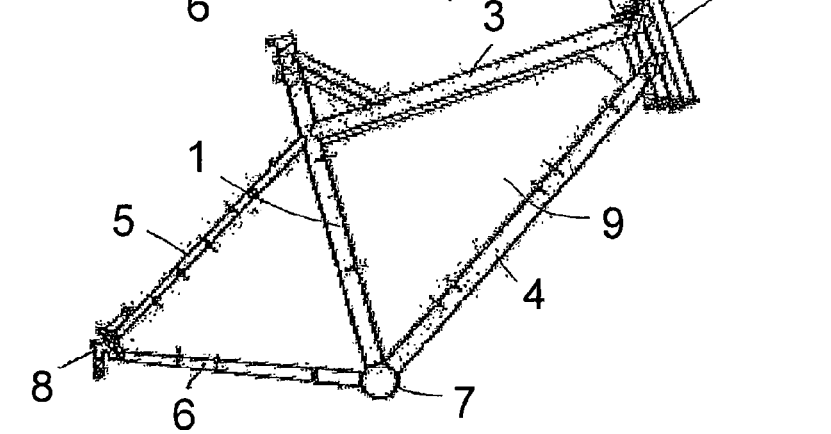
FIG. 14 shows the superimposed frames of the cycle frame system.

In the representation in FIG. 14, the frames 51, 52 and 53 of the system are superimposed.

The rear frame triangles are identical to each other in the different frames of the system. The bottom bracket housing 7 is arranged at the same location and in the same way in each case. The seat tube 1 exhibits the same length in each case over its frame portion 1a between the bottom bracket housing 7 and the fastening of the upper stay 3 and upper rear wheel stay 5. Furthermore, the angles at which the stays 3 and 4 of the front frame run onto the seat tube 1 are also the same for all the frames 1 to 8. As mentioned, the positions of the steering tube 2 are different, wherein the angles at which the stays 3 and 4 run onto the steering tube 2 are the same in each case. The steering tubes 2 are offset parallel to each other in the direction of travel X and in the vertical direction Z.

The steering tubes 2 are optionally of different lengths. The difference in relation to the vertical direction Z is compensated for by the difference in length, such that front forks which are identical or merely identical in length, and front wheels A of the same size can be used. The seat tube portions 1b which protrude above the rear frame triangle and above the front frame are also of different lengths, such that the seat and/or saddle of the frame 53 can be set higher than that of the frame 52, and the seat of the frame 52 can be extended higher than that of the frame 51.

By means of the different frames of the system, for example three different frames, and with the components otherwise unchanged, the wheeled vehicle can be very simply and cheaply adapted to different-sized riders.

Each of FIGS. 11 to 14 also shows the power source, more specifically the housing 9 of the power source. Because the front frames are congruent as far as the immediate vicinity of the steering tube 2, the same power source and/or power source housing 9 can be respectively used for all the different frames, since the area of the front frame which remains free, from the respective seat tube 1 up to the vicinity of the respective steering tube 2 and thus over the predominant part of said frame area, is the same in terms of size and shape for all the different frames.

Figure 15:
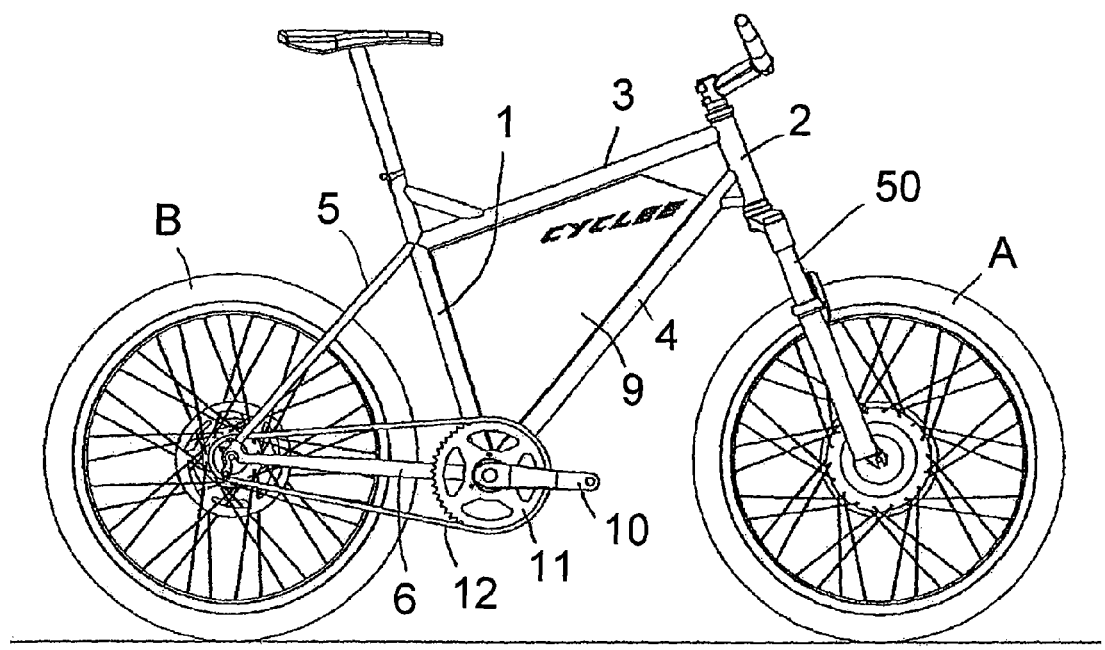
FIG. 15 shows a wheeled vehicle with a spring fork, in a lateral view.

FIG. 15 shows a lateral view of a cycle which is intended to be retro-fitted with the electric drive in accordance with the invention. The electric motor 20 still has to be assembled; the power source housing 9 has already been assembled. Apart from the power source housing 9 and the frame 1-8, it is a conventional cycle in the manner of a mountain bike. The frame 1-8 is one of the frames 51 to 53 of the frame system described on the basis of FIGS. 11 to 14, which also includes the frame of the cycle in FIGS. 1 to 3. The front fork 50 is a spring fork, unlike the rigid fork of the cycle in FIG. 1. The two frames—the frame of the cycle in FIG. 1 and the frame of the cycle in FIG. 15—can be identical; they can each for example be a frame 51.

Figure 16:
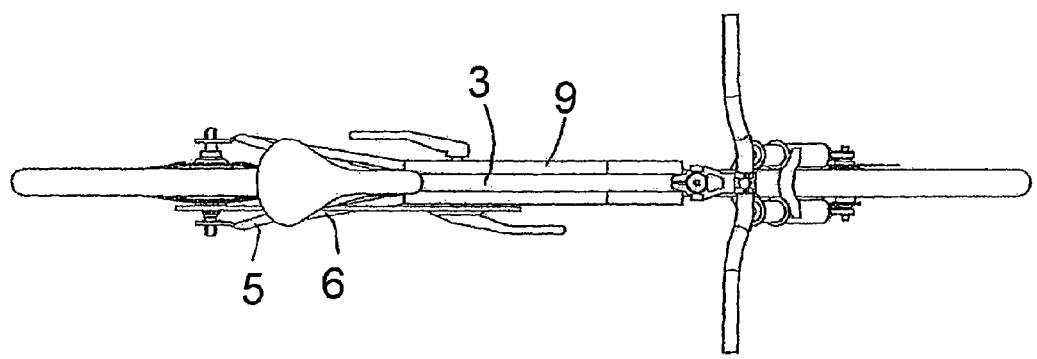
FIG. 16 shows the wheeled vehicle of FIG. 15, in a vertical top view.

FIG. 16 shows the cycle of FIG. 15 in a vertical top view. The top view shows how narrow the power source housing 9 can be, due to its large lateral area. In the example, it has an axially measured overall width which is smaller than three times the thickness of the upper stay 3.

Although the invention has been shown and described with respect to one or more particular preferred embodiments, it is clear that equivalent amendments or modifications will occur to the person skilled in the art when reading and interpreting the text and enclosed drawing(s) of this specification. In particular with regard to the various functions performed by the elements (components, assemblies, devices, compositions, etc.) described above, the terms used to describe such elements (including any reference to a "means") are intended, unless expressly indicated otherwise, to correspond to any element which performs the specified function of the element described, i.e. which is functionally equivalent to it, even if it is not structurally equivalent to the disclosed structure which performs the function in the example embodiment(s) illustrated here. Moreover, while a particular feature of the invention may have been described above with respect to only one or some of the embodiments illustrated, such a feature may also be combined with one or more other features of the other embodiments, in any way such as may be desirable or advantageous for any given application of the invention.

REFERENCE SIGNS 1 seat tube
1a seat tube portion
1b seat tube portion
2 steering tube
3 upper stay
4 lower stay
5 upper rear wheel stay
6 lower rear wheel stay
7 bottom bracket housing
8 suspension structure
9 power source housing
10 crank
11 crank pinion
12 traction means
13 crank rear wheel pinion
14 crank freewheel 15 crank shaft
16 rear wheel axis
17 securing element
18 hub
19 gear system
20 electric motor
21 motor pinion
22 traction means
23 motor rear wheel pinion
24 projection
25 stator
26 coil portion, winding
27 stator support, stator cover
27a bearing region
27b flange region
28 assembly element
28a assembly element
28b assembly element
29 stator sealing web
30 rotor
31 pole ring
32 rotor support
32a circumferential wall, magnetic return ring
32b base, connecting portion
33 rotor shaft
33a connecting flange
33b connecting flange
34 motor freewheel
35 motor shaft
36 bearing
37 thrust washer
38 seal
39 rotor sealing web
40 securing element
41 support
42 support
43 elongated hole
44 free space
45-49
50 front fork
51 first frame
52 second frame
53 third frame
A front wheel
B rear wheel
D display
$D_{20}$ motor thickness
$R_B$ rotational axis of the rear wheel
$R_{20}$ rotational axis of the electric motor
$R_{10}$ rotational axis of the crank
X direction of travel
Y transverse direction, axial direction
Z vertical direction

What is claimed is:

1. A wheeled vehicle with a crank drive and an electric drive, comprising: a) a frame which serves to suspend a front wheel and a rear wheel and comprises a seat tube, an upper rear wheel stay and a lower rear wheel stay which together at least substantially form a frame triangle for suspending the rear wheel; b) a crank for converting muscular strength into torque; c) a crank coupling for transferring the torque of the crank onto the rear wheel; d) an electric motor comprising a stator and a rotor; e) and a motor coupling for transferring a torque of the electric motor onto the rear wheel; f) wherein the crank and the electric motor output onto the same side of the rear wheel, and g) the electric motor is supported on the frame triangle h) and arranged within the frame triangle as seen in a lateral view of the wheeled vehicle,
wherein the stator comprises a stator support with a central, sleeve-shaped bearing region and a flange region which projects radially outwards from the central bearing region, and the flange region of the stator forms a stator cover for a motor housing of the electric motor.

2. The wheeled vehicle according to claim 1, wherein a rotational axis of the electric motor is nearer to the rotational axis of the rear wheel than to the seat tube, as seen in the lateral view.

3. The wheeled vehicle according to claim 1, wherein the electric motor overlaps with the crank coupling, as seen in the lateral view.

4. The wheeled vehicle according to claim 1, wherein the crank coupling comprises a traction means, and the electric motor overlaps with the traction means, as seen in the lateral view.

5. The wheeled vehicle according to claim 1, wherein the electric motor is an external rotor motor.

6. The wheeled vehicle according to claim 5, wherein: the rotor forms a rotor cup comprising a base and a circumferential wall; the rotor cup surrounds the stator on a facing side with its base and circumferentially on an outside with its circumferential wall; and a part of the rotor which electromagnetically cooperates with the stator when the electric motor is in operation is arranged on the circumferential wall of the rotor cup or forms the circumferential wall.

7. The wheeled vehicle according to claim 6, wherein the rotor cup forms a housing of the electric motor which rotates when the electric motor is in operation, and the stator forms the stator cover for the rotor cup.

8. The wheeled vehicle according to claim 7, wherein the electric motor is fastened to the wheeled vehicle in the region of the stator cover.

9. The wheeled vehicle according to claim 7, wherein the stator forms the stator cover on an interior side of the electric motor which faces the rear wheel.

10. The wheeled vehicle according to claim 7, wherein the stator and the rotor form a shaft seal with each other, circumferentially about the rotational axis of the rotor.

11. The wheeled vehicle according to claim 10, wherein the stator comprises a stator sealing web on the stator cover, and the rotor comprises a rotor sealing web on the circumferential wall of the rotor cup.

12. The wheeled vehicle according to claim 11, wherein at least one of the stator sealing web and the rotor sealing web circumferentially forms at least one sealing groove, and the other sealing web circumferentially forms a sealing ring which protrudes into the sealing groove.

13. The wheeled vehicle according to claim 12, wherein the sealing ring protrudes axially into the sealing groove.

14. The wheeled vehicle according to claim 1, wherein a rotor cup comprises a rotor shaft which extends from the base of the rotor cup into the central bearing region, the rotor cup rotatably supported on the stator support.

15. The wheeled vehicle according to claim 1, wherein: the motor coupling extends axially between the rear wheel and the crank coupling; the stator and the rotor are arranged axially further on an outside than the crank coupling, as seen from the rear wheel; and a motor shaft of the electric motor protrudes from an outside beyond the crank coupling, towards the rear wheel.

16. The wheeled vehicle according to claim 1, wherein a variable gear system with a gear input shaft is arranged on the rear wheel, and both the crank and the electric motor output onto the gear system.

17. The wheeled vehicle according to claim 16, wherein the gear system is arranged in a hub of the rear wheel.

18. The wheeled vehicle according to claim 16, wherein both the crank and the electric motor output onto the gear input shaft.

19. The wheeled vehicle according to claim 1, wherein the crank coupling comprises a crank rear wheel pinion which can be rotated about a rotational axis of the rear wheel and can be driven by means of the crank, and the motor coupling additionally comprises a motor rear wheel pinion which can be rotated about the rotational axis and can be driven by the electric motor.

20. The wheeled vehicle according to claim 19, wherein the rear wheel pinions are arranged axially next to each other on a same side of the rear wheel and form a rotational unit with respect to a drive rotational direction and the opposite rotational direction.

21. The wheeled vehicle according to claim 1, wherein the motor coupling comprises a motor output pinion which can be rotary-driven by the rotor in a drive rotational direction, a motor rear wheel pinion which can be rotated about a rotational axis of the rear wheel, and a toothed belt which winds around the pinions.

22. The wheeled vehicle according to claim 21, wherein the toothed belt is a fiber-reinforced plastic toothed belt.

23. The wheeled vehicle according to claim 1, wherein: the electric motor comprises a motor shaft, and the motor coupling comprises a motor output pinion which is arranged on the motor shaft, fixedly in terms of torque; the motor shaft protrudes into or through a central hollow space of the rotor and is axially secured relative to the rotor by means of a releasable axial securing means; and the axial securing means is arranged outside a housing of the electric motor.

24. The wheeled vehicle according to claim 1, wherein the torque of the electric motor can be transferred onto a rotational axis of the rear wheel via a motor freewheel which is spaced from the rotational axis of the rear wheel and/or the torque of the crank can be transferred onto the rotational axis of the rear wheel via a crank freewheel which is spaced from the rotational axis of the rear wheel.

25. A wheeled vehicle with a crank drive and an electric drive, comprising: a) a frame which serves to suspend a front wheel and a rear wheel and comprises a seat tube, an upper rear wheel stay and a lower rear wheel stay which together at least substantially form a frame triangle for suspending the rear wheel; b) a crank for converting muscular strength into torque; c) a crank coupling for transferring the torque of the crank onto the rear wheel; d) an electric motor comprising a stator and a rotor; e) and a motor coupling for transferring a torque of the electric motor onto the rear wheel; f) wherein the crank and the electric motor output onto the same side of the rear wheel, and g) the electric motor is supported on the frame triangle h) and arranged within the frame triangle as seen in a lateral view of the wheeled vehicle,
wherein the electric motor is supported on the upper rear wheel stay by means of an upper support and on the lower rear wheel stay by means of a lower support, wherein a traction means of the crank coupling extends in a free space.

26. The wheeled vehicle according to claim 25, wherein the lower support is separate from the upper support.

27. The wheeled vehicle according to claim 25, wherein free space remains between the supports, as seen in the lateral view.

28. The wheeled vehicle according to claim 25, wherein the stator and the rotor of the electric motor are arranged axially further on an outside than the supports, as seen from the rear wheel, and a motor shaft of the electric motor extends through and/or between the supports towards the rear wheel.

29. A wheeled vehicle with a crank drive and an electric drive, comprising: a) a frame which serves to suspend a front wheel and a rear wheel and comprises a seat tube, an upper rear wheel stay and a lower rear wheel stay which together at least substantially form a frame triangle for suspending the rear wheel; b) a crank for converting muscular strength into torque; c) a crank coupling for transferring the torque of the crank onto the rear wheel; d) an electric motor comprising a stator and a rotor; e) and a motor coupling for transferring a torque of the electric motor onto the rear wheel; f) wherein the crank and the electric motor output onto the same side of the rear wheel, and g) the electric motor is supported on the frame triangle h) and arranged within the frame triangle as seen in a lateral view of the wheeled vehicle,
wherein the electric motor is supported on the frame triangle by means of a support device and is in an engagement, which can be loosened, with the support device such that when the engagement is loosened but still extant, the electric motor can be moved relative to the support device and can be fixed in at least one of a number of different positions.

30. An electric motor for driving a wheeled vehicle, said electric motor comprising: a) a stator; b) and a rotor with a rotor cup which comprises a base and a circumferential wall and surrounds the stator on a facing side with its base and circumferentially on an outside with its circumferential wall; c) wherein a part of the rotor which electromagnetically cooperates with the stator when the electric motor is in operation is arranged on the circumferential wall of the rotor cup or forms the circumferential wall, d) and wherein the rotor cup forms a housing of the electric motor which rotates when the electric motor is in operation, e) and the stator forms a stator cover which closes the rotor cup off in a water-proof seal,
wherein the stator comprises a stator cover with a central, sleeve-shaped bearing region and a flange region which projects radially outwards from the central bearing region; an electromagnetically active part of the stator is arranged on an outer circumference of the central bearing region; and the flange region of the stator forms the stator cover for closing the rotor cup off in a water-proof seal.

31. The electric motor according to claim 30, wherein the stator forms the stator cover for the rotor cup axially opposite the base of the rotor cup.

32. An electric motor for driving a wheeled vehicle, said electric motor comprising: a) a stator; b) and a rotor with a rotor cup which comprises a base and a circumferential wall and surrounds the stator on a facing side with its base and circumferentially on an outside with its circumferential wall; c) wherein a part of the rotor which electromagnetically cooperates with the stator when the electric motor is in operation is arranged on the circumferential wall of the rotor cup or forms the circumferential wall, d) and wherein the rotor cup forms a housing of the electric motor which rotates when the electric motor is in operation, e) and the stator forms a stator cover which closes the rotor cup off in a water-proof seal,
wherein the stator forms the stator cover for the rotor cup axially opposite the base of the rotor cup, and
wherein: the stator comprises a stator cover with a central, sleeve-shaped bearing region and a flange region which projects radially outwards from the central bearing region; the flange region of the stator forms the stator cover; and the rotor cup comprises a rotor shaft which extends from the base of the rotor cup into the central bearing region, where it is rotatably supported on the stator support.

33. The electric motor according to claim 30, wherein the stator and the rotor form a shaft seal with each other, circumferentially about the rotational axis of the rotor.

34. The electric motor according to claim 33, wherein the stator comprises a stator sealing web on the stator cover, and the rotor comprises a rotor sealing web, which axially or radially overlaps the stator sealing web, on the circumferential wall of the rotor cup.

35. The electric motor according to claim 34, wherein at least one of the stator sealing web and the rotor sealing web circumferentially forms at least one sealing groove, and the other sealing web circumferentially forms a sealing ring which protrudes into the sealing groove.

36. The electric motor according to claim 35, wherein the sealing ring protrudes axially into the sealing groove.

37. The electric motor according to claim 30, wherein the electric motor is or can be assembled on a support device of the wheeled vehicle in the region of the stator cover and comprises one or more assembly elements in the region of the stator cover for assembling the electric motor on the support device.

38. The electric motor according to claim 30, wherein: the electric motor comprises a motor shaft, and the motor coupling comprises a motor output pinion which is arranged on the motor shaft, fixedly in terms of torque; the motor shaft protrudes into or through a central hollow space of the rotor and is axially secured relative to the rotor by means of a releasable axial securing means; and the axial securing means is arranged outside the motor housing of the electric motor formed by the rotor cup and the stator cover.

39. An electric drive, comprising: a) an electric motor according to claim 30; b) a motor output pinion which can be rotary-driven by the rotor in a drive rotational direction; c) and a shaft pinion which can be rotated about the rotational axis of a shaft to be driven, d) wherein the electric drive comprises a toothed belt which winds around the pinions, or the pinions are in a toothed engagement with each other.

* * * * *